(12) United States Patent
Dudar

(10) Patent No.: US 10,590,874 B2
(45) Date of Patent: Mar. 17, 2020

(54) SYSTEMS AND METHODS FOR CONDUCTING ONBOARD ENGINE CLEANING ROUTINES IN A VEHICLE

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 15/804,095

(22) Filed: Nov. 6, 2017

(65) Prior Publication Data

US 2019/0136775 A1 May 9, 2019

(51) Int. Cl.
*F02D 41/00* (2006.01)
*B60W 10/06* (2006.01)
(Continued)

(52) U.S. Cl.
CPC ......... *F02D 41/0077* (2013.01); *B60W 10/06* (2013.01); *B60W 10/08* (2013.01);
(Continued)

(58) Field of Classification Search
CPC .. B60T 17/02; F02M 26/14; F02M 35/10222; F02M 25/0221; F02M 35/104; F02M 26/20; F02M 25/028; F02M 25/0227; F02D 35/027; F02D 41/0027; F02D 21/02; F02D 41/0077; F02D 41/083; F02D 41/3076; F02D 41/0052; F02D 41/0087; F02D 17/02; F02D 41/26; B60H 1/3233; F01P 3/20; B60W 10/04; B60W 10/18; B60W 30/1819; F01N 13/10; F02P 5/152

See application file for complete search history.

(56) References Cited

U.S. PATENT DOCUMENTS

| | | | |
|---|---|---|---|
| 5,937,799 A | 8/1999 | Binion | |
| 6,223,716 B1 * | 5/2001 | Kadota | ................... B60T 17/02 123/295 |

(Continued)

FOREIGN PATENT DOCUMENTS

| | | |
|---|---|---|
| EP | 2577021 B1 | 9/2015 |
| WO | 2014081802 A1 | 5/2014 |

OTHER PUBLICATIONS

Dudar, A., "Systems and Methods for Diagnosing a Vehicle Humidity Sensor," U.S. Appl. No. 15/660,015, filed Jul. 26, 2017, 66 pages.
(Continued)

*Primary Examiner* — Behrang Badii
(74) *Attorney, Agent, or Firm* — Geoffrey Brumbaugh; McCoy Russell LLP

(57) ABSTRACT

Methods and systems are provided for mitigating issues related to sluggish engine performance. In one example, a method comprises, responsive to an indication of degradation of one or more cylinders in the engine, reducing carbon buildup associated with the one or more cylinders via injecting a diesel exhaust fluid into an intake manifold of the engine while the engine is combusting air and fuel. In this way, a water content of the diesel exhaust fluid may be vaporized in the one or more engine cylinders, which may effectively reduce the carbon buildup.

6 Claims, 10 Drawing Sheets

(51) Int. Cl.
*B60W 10/08* (2006.01)
*B60W 20/00* (2016.01)
*F02B 77/04* (2006.01)
*F02M 35/10* (2006.01)
*F01N 3/021* (2006.01)
*F01N 3/10* (2006.01)
*F01N 3/20* (2006.01)

(52) U.S. Cl.
CPC ............ *B60W 20/00* (2013.01); *F02B 77/04* (2013.01); *F02D 41/0025* (2013.01); *F02D 41/0055* (2013.01); *F02M 35/10222* (2013.01); *F01N 3/021* (2013.01); *F01N 3/103* (2013.01); *F01N 3/208* (2013.01); *F01N 2610/02* (2013.01); *F01N 2900/08* (2013.01); *F02D 2200/1006* (2013.01); *Y10S 903/905* (2013.01); *Y10S 903/906* (2013.01)

(56) References Cited

U.S. PATENT DOCUMENTS

| | | |
|---|---|---|
| 7,406,971 B2 | 8/2008 | Velez, Jr. |
| 8,627,845 B2 | 1/2014 | Hanson et al. |
| 8,986,461 B2 | 3/2015 | Hischier et al. |
| 2007/0084423 A1 | 4/2007 | LeBeaux |
| 2010/0275584 A1 | 11/2010 | Wada et al. |
| 2013/0206100 A1 | 8/2013 | Yacoub |
| 2017/0356364 A1* | 12/2017 | Glugla ................ F02D 41/0087 |
| 2017/0356372 A1* | 12/2017 | Richards ................ F02D 13/04 |
| 2018/0038300 A1* | 2/2018 | Hakeem ............... F02D 41/0082 |
| 2018/0079281 A1* | 3/2018 | Leone .................. B60H 1/3233 |
| 2018/0171891 A1* | 6/2018 | McQuillen .............. F02D 19/12 |
| 2018/0171935 A1* | 6/2018 | McQuillen ......... F02M 25/0227 |
| 2018/0171936 A1* | 6/2018 | McQuillen .......... F02D 41/0065 |
| 2018/0291843 A1* | 10/2018 | McQuillen ............ F02D 41/064 |

OTHER PUBLICATIONS

Dudar, A., "Systems and Methods for Conducting Onboard Engine Cleaning Routines in a Vehicle," U.S. Appl. No. 15/804,110, filed Nov. 6, 2017, 89 pages.

Dudar, A., "Systems and Methods for Conducting Onboard Engine Cleaning Routines in a Vehicle," U.S. Appl. No. 15/804,143, filed Nov. 6, 2017, 88 pages.

United States Patent and Trademark Office, Office Action Issued in U.S. Appl. No. 15/804,143, dated Nov. 14, 2019, 16 pages.

* cited by examiner

SYSTEMS AND METHODS FOR CONDUCTING ONBOARD ENGINE CLEANING ROUTINES IN A VEHICLE

FIELD

The present description relates generally to methods and systems for controlling a vehicle engine system to clean particular engine components via onboard and on-demand techniques.

BACKGROUND/SUMMARY

As engines accumulate mileage, carbon deposits may build up over time. Such carbon deposits may accumulate on top of one or more pistons in one or more engine cylinders, and/or on the intake and exhaust valves of the engine cylinders. Such carbon buildup may be the result of frequent drive cycles that are short in nature, regular use of low grade fuel, improper air/fuel ratio during vehicle operation, etc. In the event of such carbon buildup, the engine may run rough and may be sluggish to respond. Furthermore, such carbon buildup may degrade fuel economy, increase tailpipe emissions, and may cause knock issues while the engine is combusting air and fuel.

To address these issues, engine additives are often utilized, which may serve to clean engine cylinders of such carbon deposits. However, such additives may be introduced into an intake manifold of the engine, which may thus require intrusive actions such as disconnecting a vacuum line in the engine, and introducing the additive fluid to the engine via the vacuum line. In other words, such a solution may not be desirable to a vehicle operator, as the vehicle may need to be serviced to conduct such an operation. Still further, such additives are costly, and many vehicle operators may not be aware that such additives even exist or that they may be useful for particular aspects of vehicle operation. Still further, there may be circumstances in the future where vehicles are autonomously driven (e.g. autonomous vehicles), and as such, there may not be a driver present to notice engine sluggishness due to carbon buildup. In such cases, fuel economy may become degraded, which may lead to undesired emissions being released to atmosphere.

The inventors herein have recognized these issues, and have developed systems and methods to at least partially address them. In one example, a method comprises, in response to an indication of degradation in one or more cylinders of an engine of a vehicle, reducing a carbon buildup associated with the one or more cylinders by injecting a diesel exhaust fluid into an intake manifold of the engine, and drawing the diesel exhaust fluid into the engine while the engine is combusting air and fuel. In this way, the carbon buildup may be reduced in an onboard, and on-demand fashion.

In one example of the method, the diesel exhaust fluid is stored in a tank positioned in a diesel exhaust fluid system, where a first diesel exhaust fluid line is configured to selectively route the diesel exhaust fluid to an exhaust passage, and where a second diesel exhaust fluid line is configured to selectively route the diesel exhaust fluid to the intake manifold.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for conducting onboard and on-demand cleaning operations to reduce or remove carbon buildup associated with various engine componentry. The systems and methods may include vaporization of diesel exhaust fluid (DEF) from a DEF injection system, which may result in the water content of the DEF being converted to steam, which may effectively clean the carbon buildup. Such systems and methods may be particularly useful in hybrid vehicles, such as the hybrid vehicle depicted at FIG. 1, where a motor may be utilized to spin the engine unfueled, which may comprise a way of delivering the DEF to an exhaust gas recirculation (EGR) system, such as that depicted at FIG. 2A. In one example, DEF may be injected into an exhaust passage (see FIG. 2A), and routed to the EGR system via spinning the engine unfueled in reverse with an EGR valve open. In another example, DEF may be injected into an intake manifold, via an introduced DEF line as illustrated at FIG. 2B, where the engine may be spun unfueled in a forward direction to route DEF to the EGR system under conditions where the EGR valve is open. In either case, subsequent to the DEF being routed to the EGR system, the engine may be operated in a combustion-mode of operation, to direct heat to the EGR system, thus serving to vaporize the water content of the DEF, which may effectively clean carbon deposits associated with the EGR valve or EGR passage. In another example, DEF may be injected into the intake manifold while the engine is combusting air and fuel, such that the DEF may be drawn into the engine, whereby engine cylinders may be cleaned of carbon deposits as the DEF is vaporized within the engine cylinders.

Figure 3A:
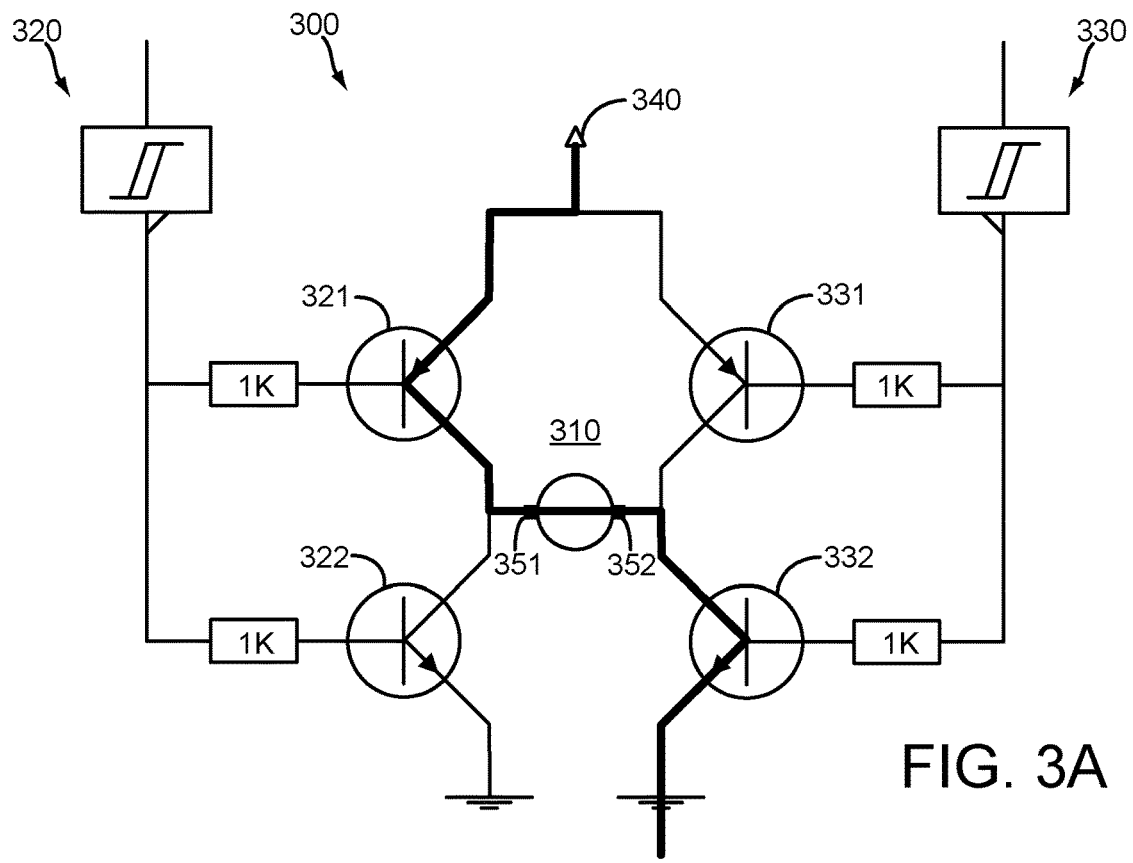
FIGS. 3A-3B schematically shows an example H-bridge circuit which may be used to rotate a vehicle engine in a forward or reverse direction.
Figure 3B:
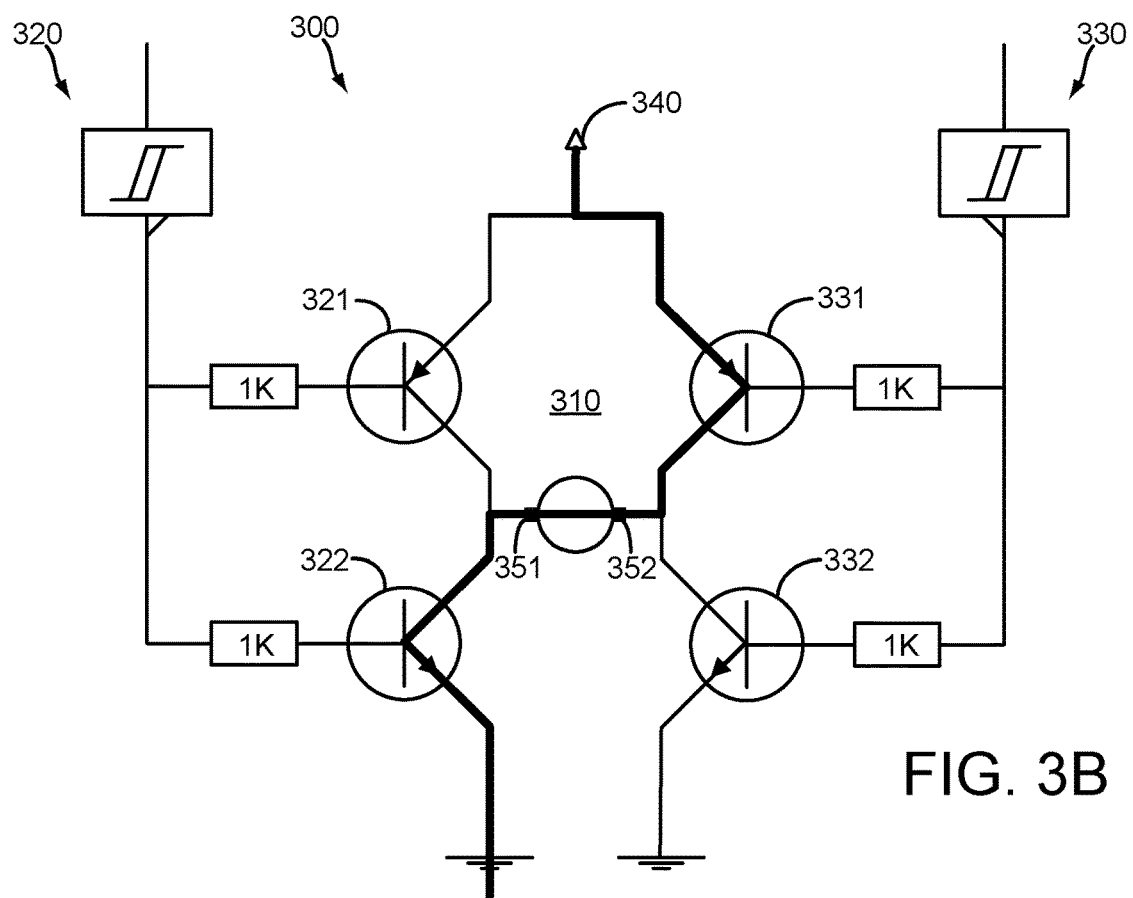
Figure 4:
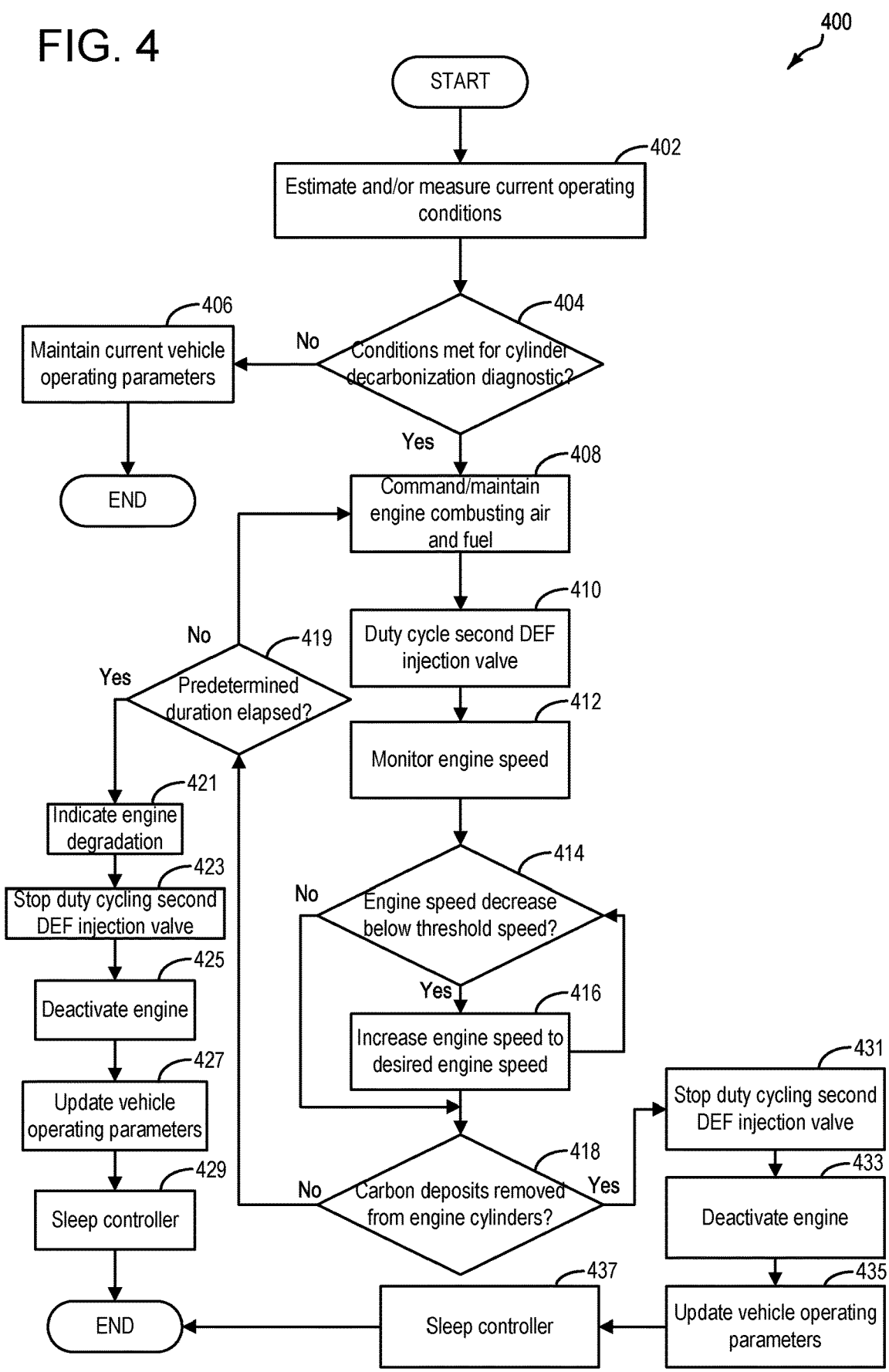
FIG. 4 shows a high-level flowchart for conducting a cleaning operation of cylinders of an engine.
Figure 5:
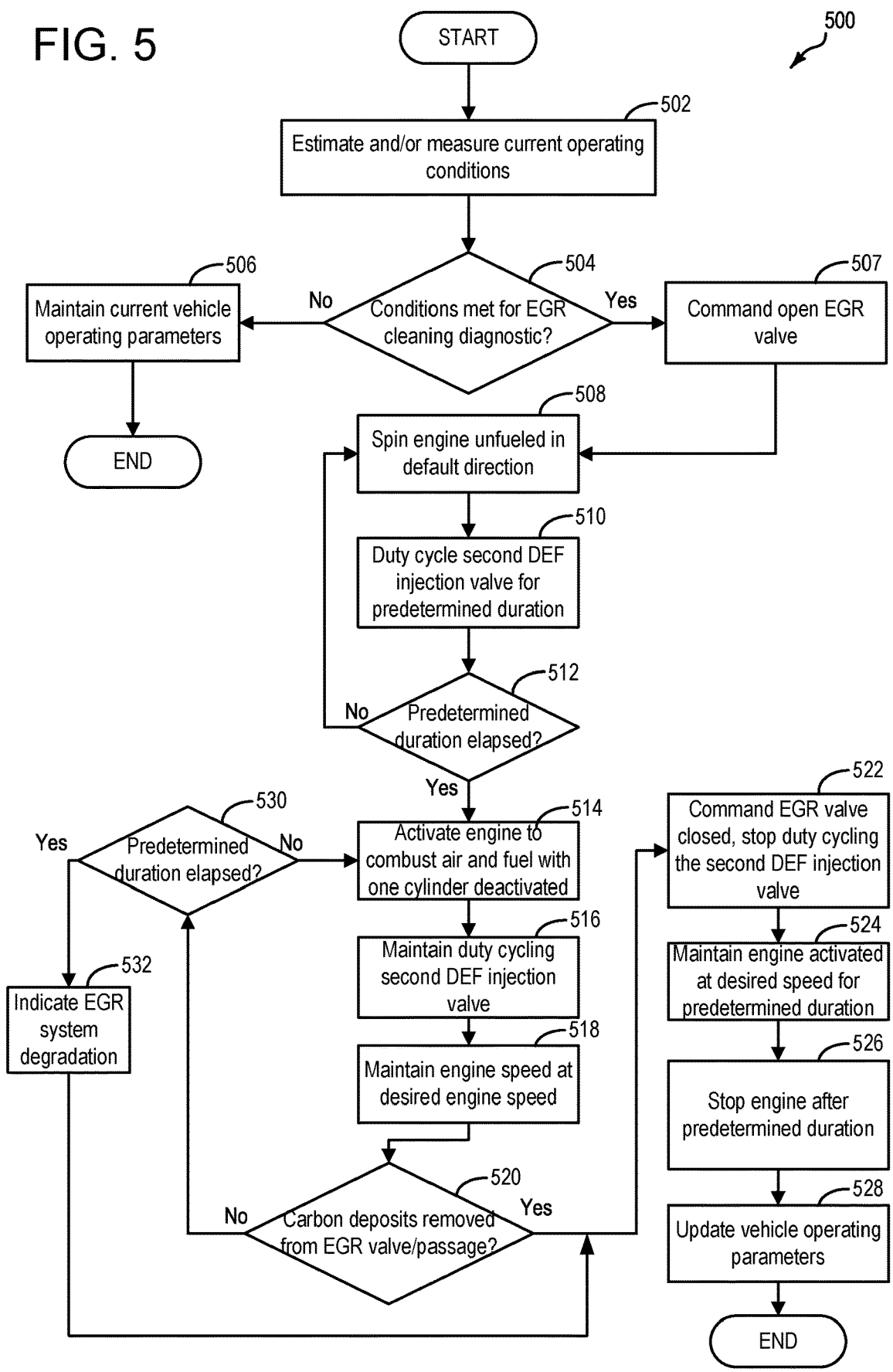
FIG. 5 shows a high-level flowchart for conducting an exhaust gas recirculation system cleaning operation.
Figure 6:
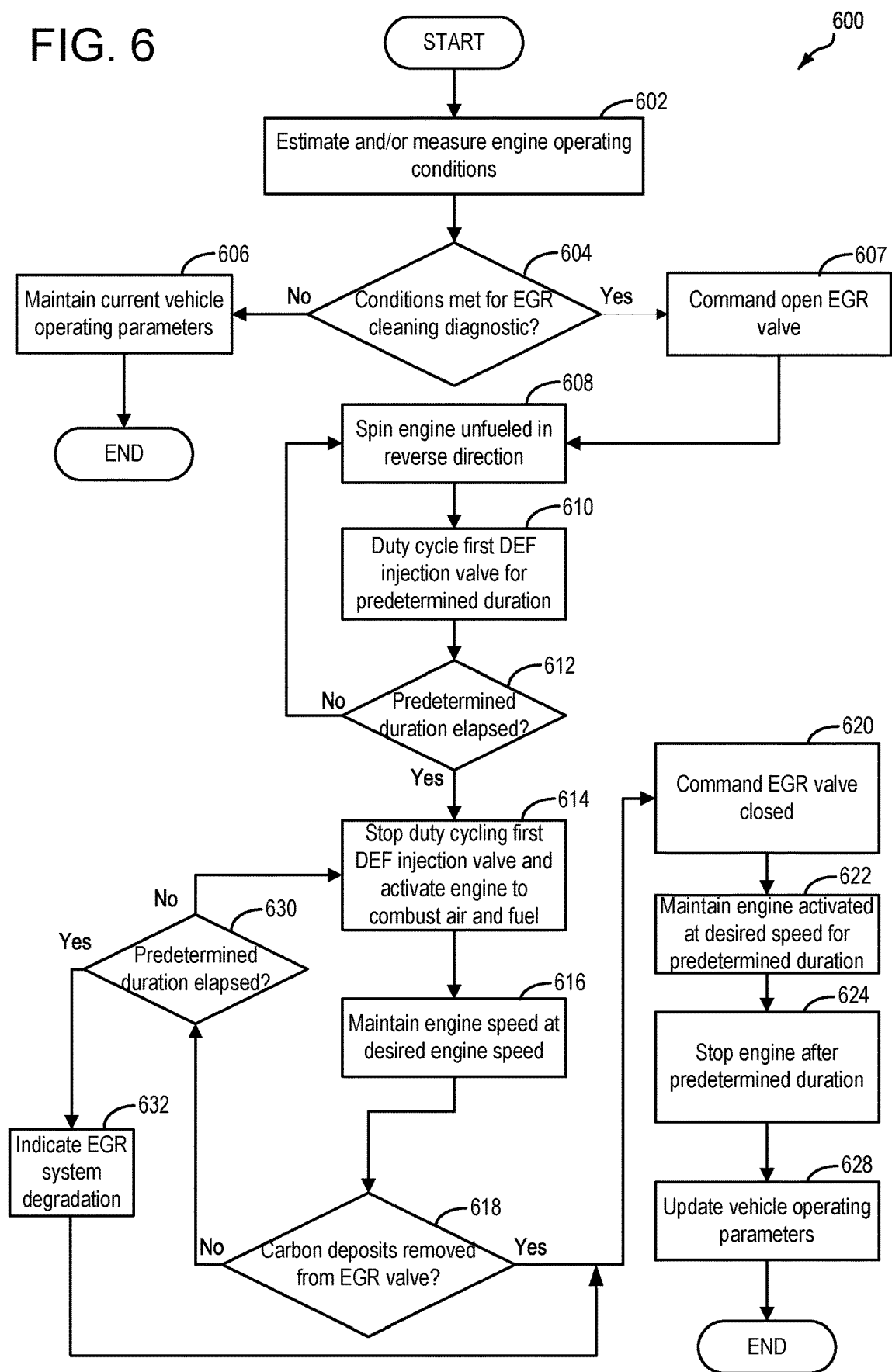
FIG. 6 shows a high-level flowchart for another example of conducting an exhaust gas recirculation system cleaning operation.
Figure 7:
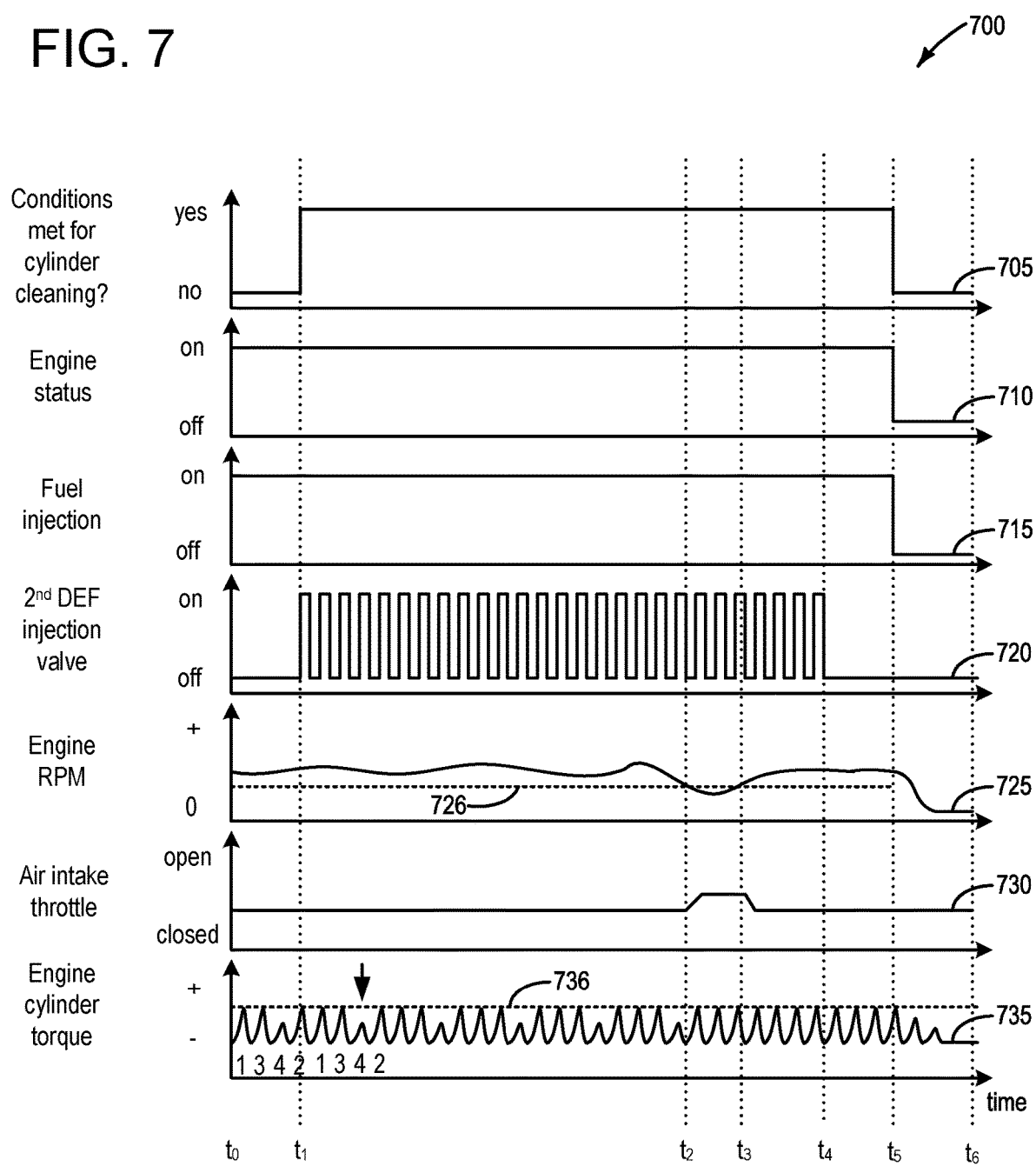
FIG. 7 depicts an example timeline for conducting the cleaning operation of engine cylinders, according to the method of FIG. 4.
Figure 8:
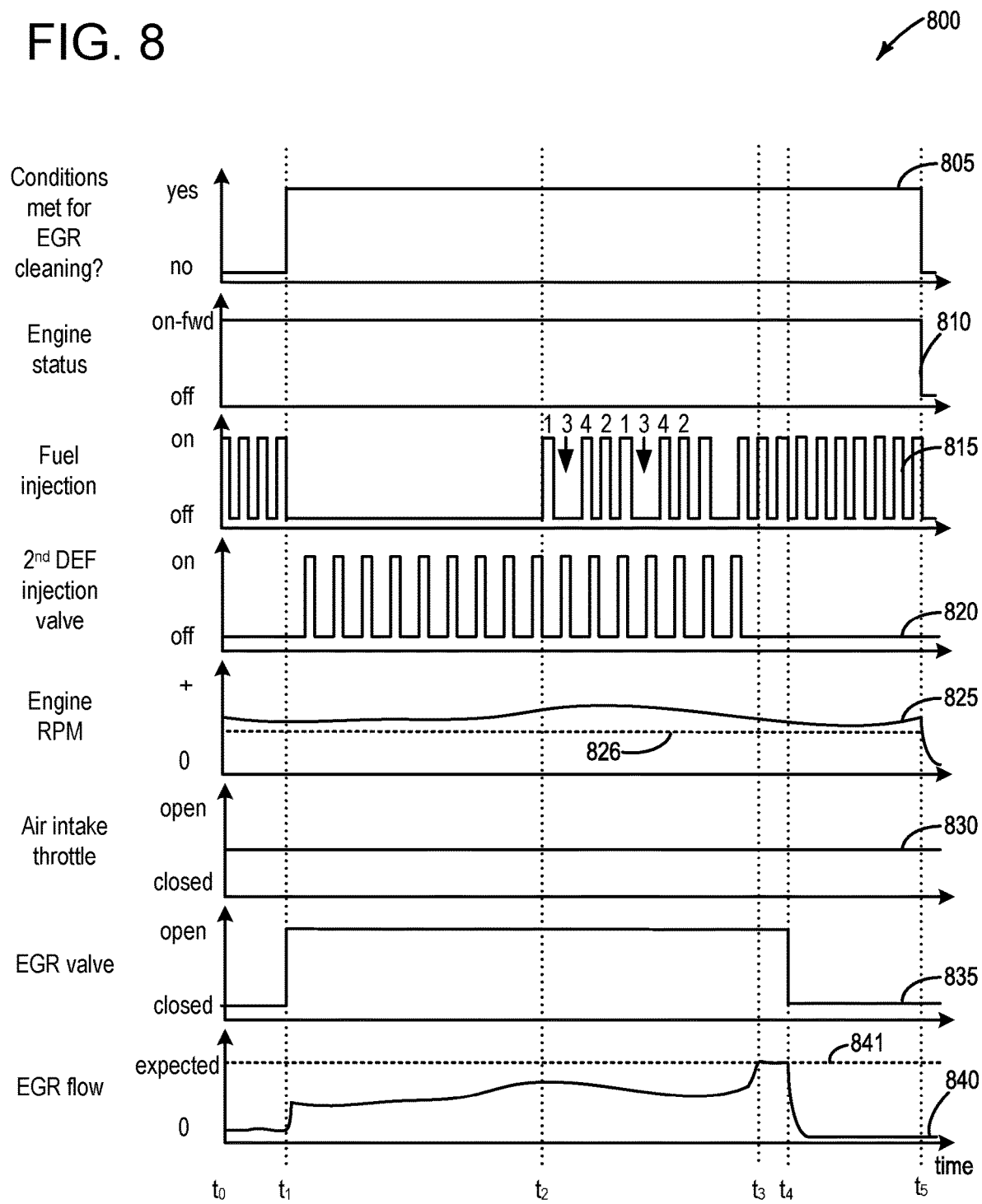
FIG. 8 depicts an example timeline for conducting the exhaust gas recirculation system cleaning operation, according to the method of FIG. 5.
Figure 9:
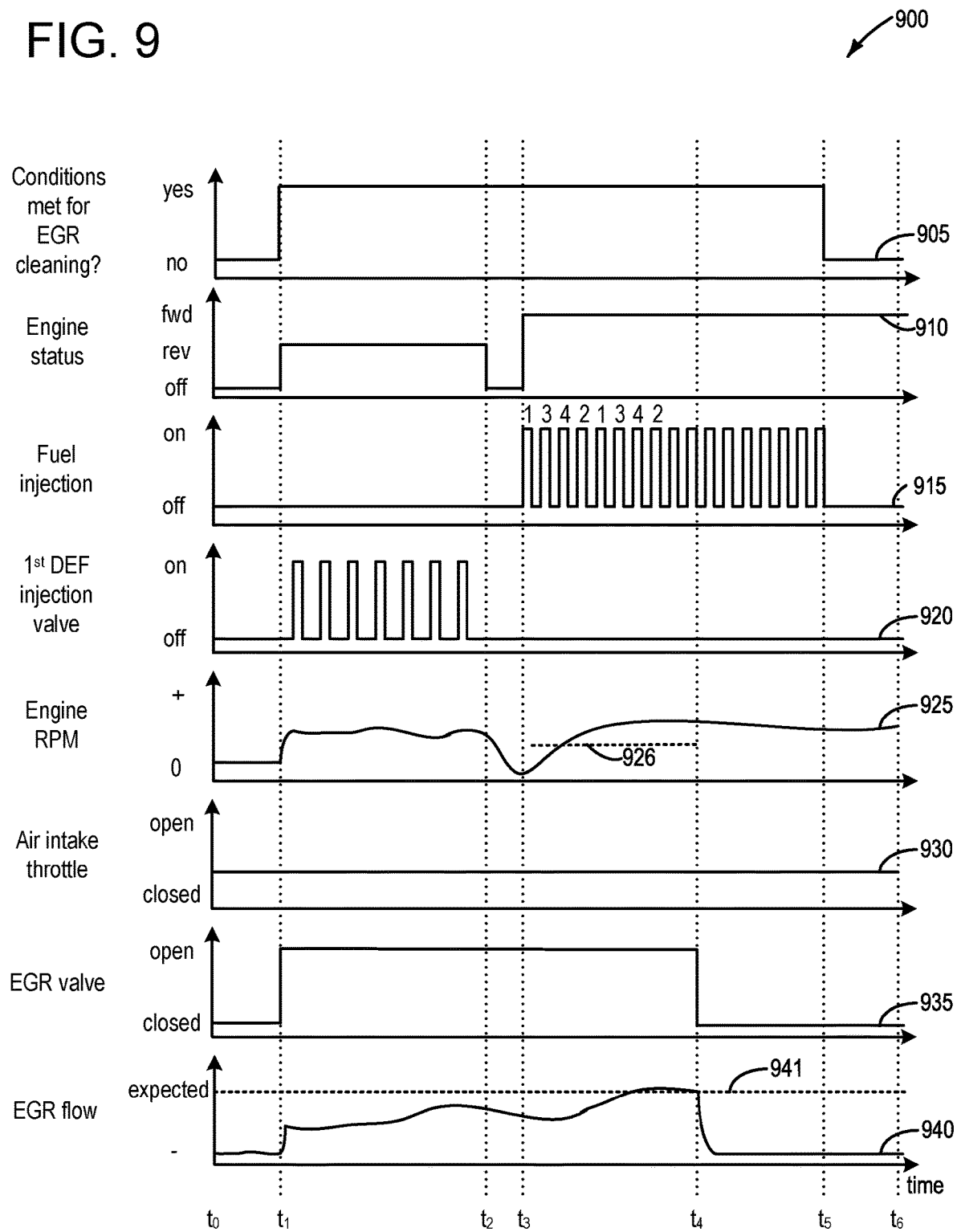
FIG. 9 depicts an example timeline for conducting the exhaust gas recirculation system cleaning operation, according to the method of FIG. 6.

To spin the engine in the forward or reverse direction unfueled, an H-bridge such as that depicted at FIGS. 3A-3B, may be utilized. FIG. 4 depicts a method whereby carbon deposits may be removed from engine cylinders via DEF injection into the intake manifold, FIG. 5 depicts a method whereby carbon deposits may be removed from the EGR system via DEF injection into the intake manifold, and FIG. 6 depicts a method whereby carbon deposits may be removed from the EGR system via DEF injection into the exhaust manifold. A timeline for conducting the engine cylinder cleaning operation of FIG. 4 is depicted at FIG. 7, a timeline for conducting the EGR system cleaning operation of FIG. 5 is depicted at FIG. 8, and a timeline for conducting the EGR system cleaning operation of FIG. 6 is depicted at FIG. 9.

Figure 1:
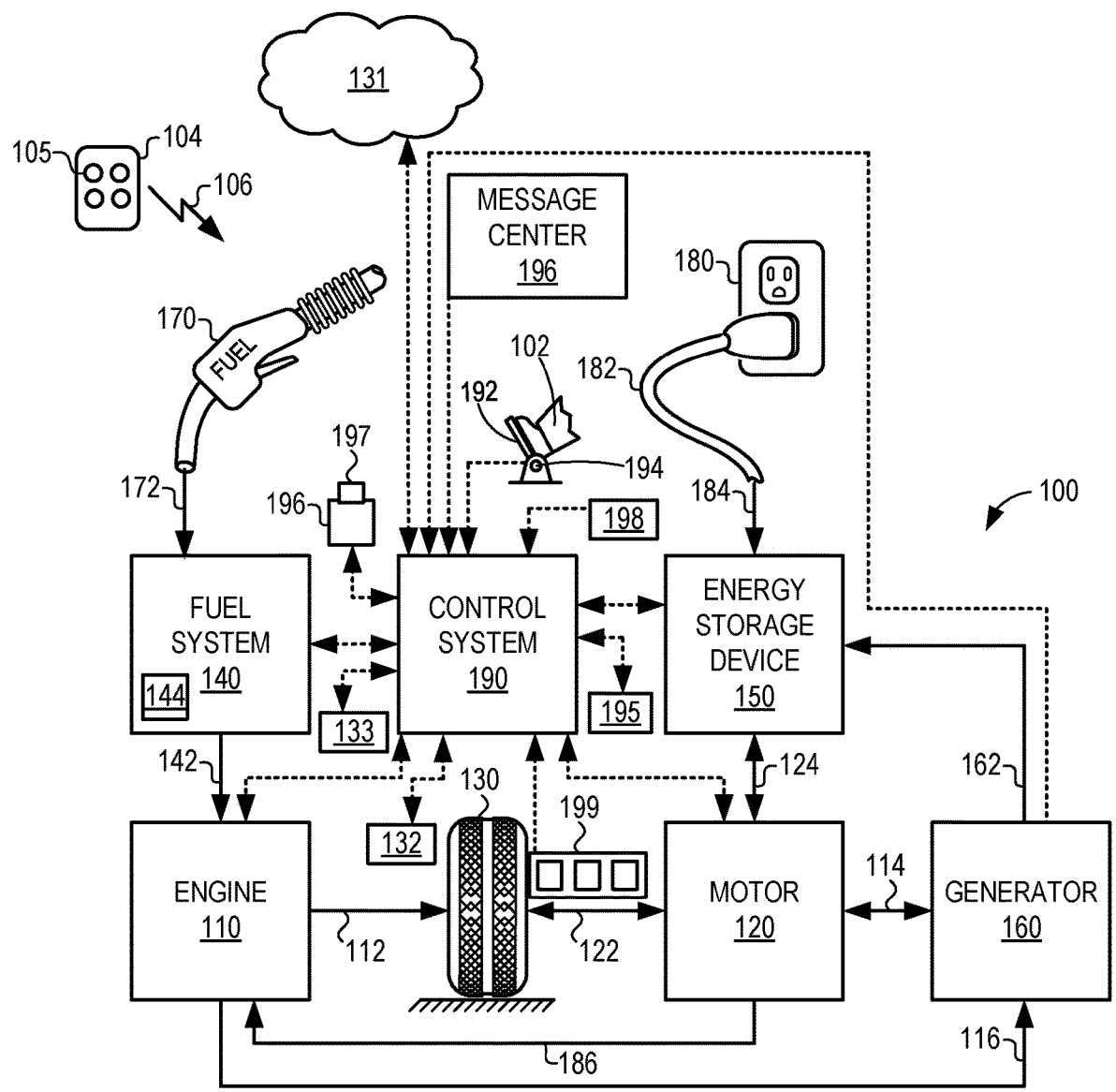
FIG. 1 schematically shows an example vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

In still other examples, which will be discussed in further detail below, motor 120 may be configured to rotate engine unfueled in a forward (e.g. default orientation) or reverse orientation, using energy provided via energy storage device 150, exemplified by arrow 186.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal. Furthermore, in some examples control system 190 may be in communication with a remote engine start receiver 195 (or transceiver) that receives wireless signals 106 from a key fob 104 having a remote start button 105. In other examples (not shown), a remote engine start may be initiated via a cellular telephone, or smartphone based system where a user's cellular telephone sends data to a server and the server communicates with the vehicle to start the engine.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc.

Figure 2A:
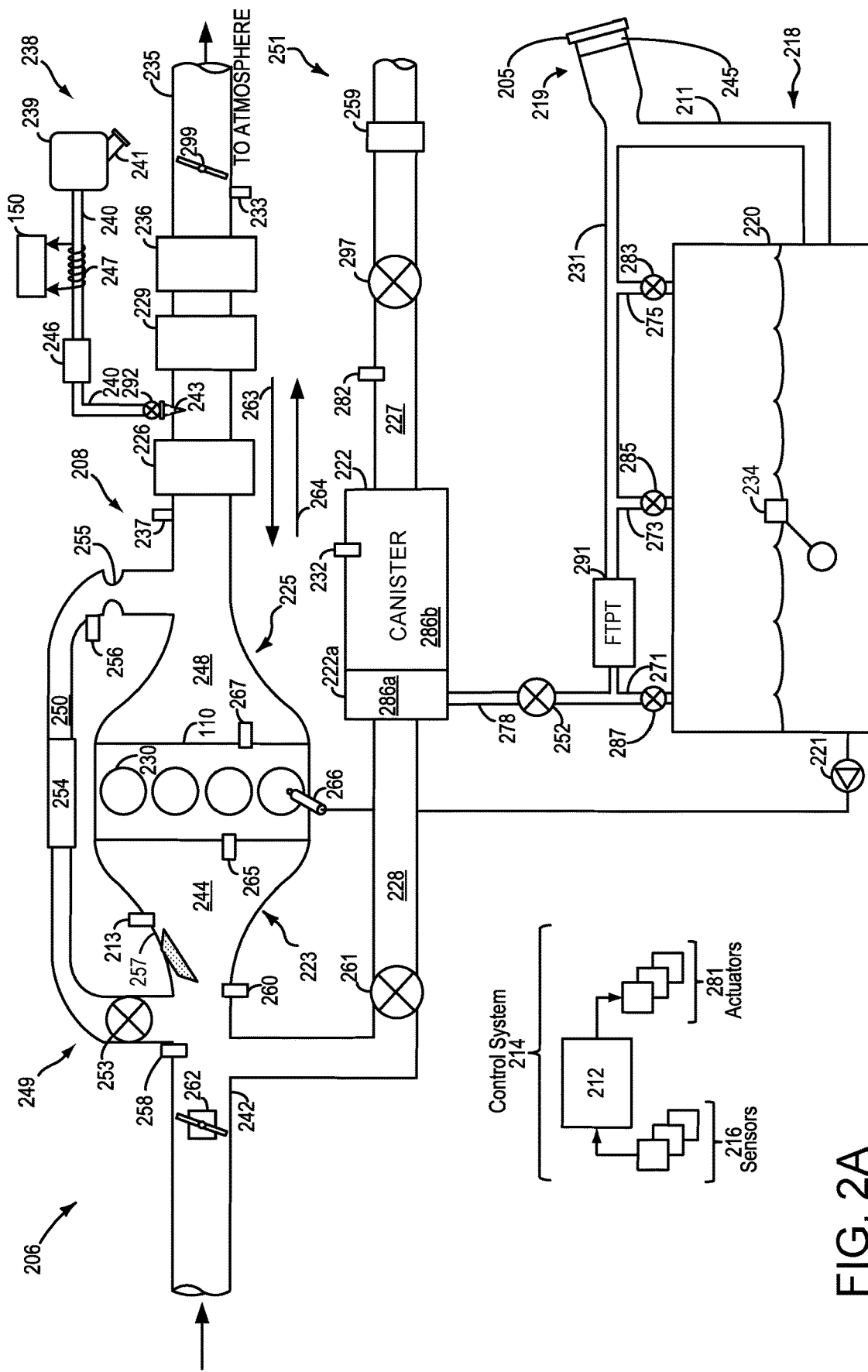
FIG. 2A schematically shows an example vehicle system with a diesel exhaust fluid (DEF) system configured to inject reductant into an exhaust system of an engine.
Figure 2B:
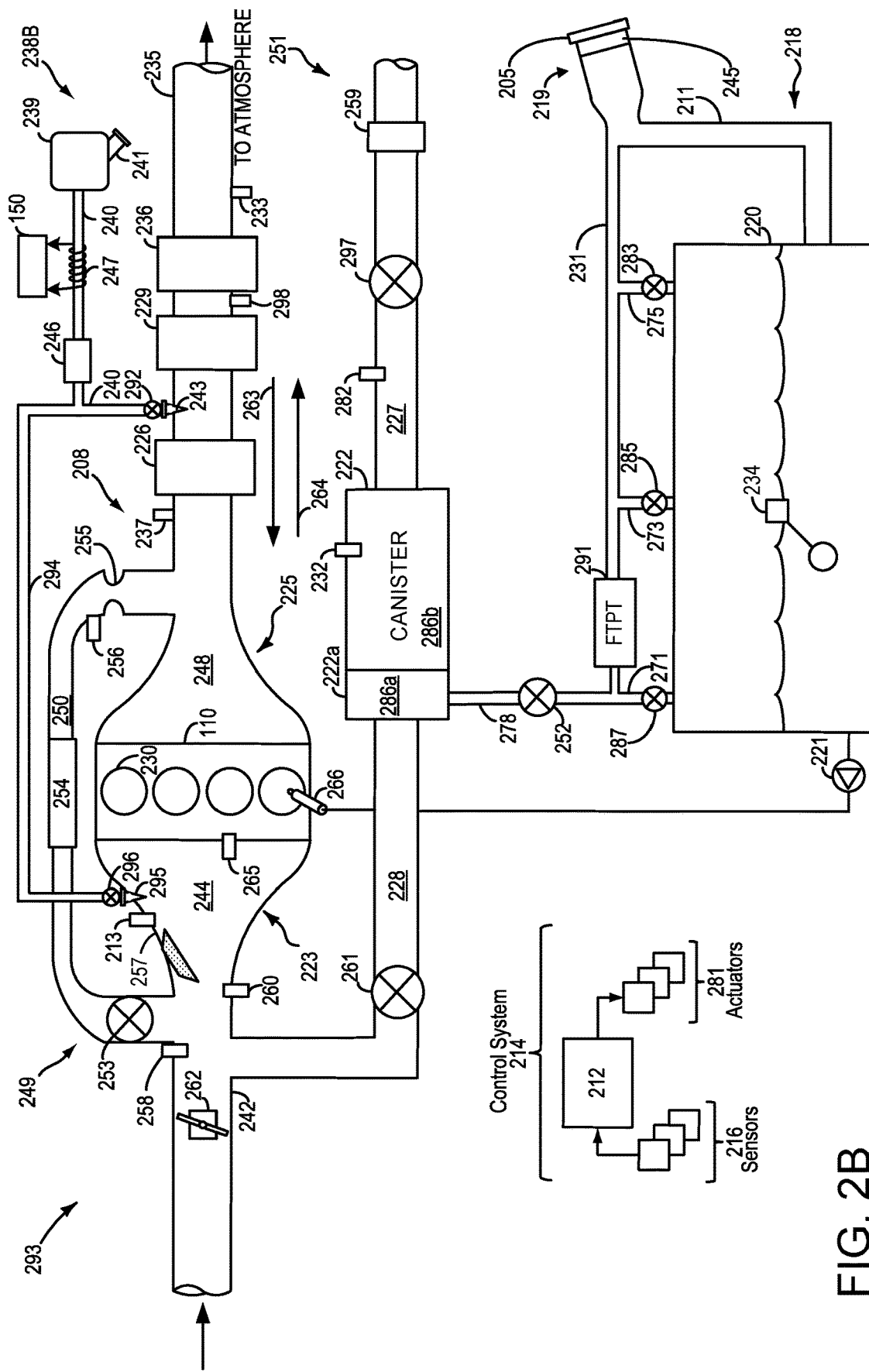
FIG. 2B schematically shows an example vehicle system with a DEF system configured to inject reductant into an exhaust system and/or an intake system of an engine.

FIG. 2A shows a schematic depiction of a vehicle system 206. It may be understood that vehicle system 206 may comprise the same vehicle system as vehicle system 100 depicted at FIG. 1. The vehicle system 206 includes an engine system 208 coupled to an emissions control system 251 and a fuel system 218. It may be understood that fuel system 218 may comprise the same fuel system as fuel system 140 depicted at FIG. 1. Emission control system 251 includes a fuel vapor container or canister 222 which may be used to capture and store fuel vapors. The engine system 208 may include an engine 110 having a plurality of cylinders 230. The engine 110 includes an engine air intake system 223 and an engine exhaust system 225. The engine air intake 223 includes a throttle 262 in fluidic communication with engine intake manifold 244 via an intake passage 242. In some examples, throttle 262 may comprise an electronic throttle, which may be commanded to a desired position via controller 212. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The exhaust passage may lead to one or more exhaust after-treatment devices (e.g. 226, 229, 236), as well as a reductant delivery and storage system, such as diesel exhaust fluid (DEF) system 238. In some examples, the exhaust passage may include an exhaust tuning valve 299, which may comprise a butterfly valve, for example, and which may be controllable via the controller to fully open or fully closed positions, or somewhere in between fully open and/or fully closed.

The exhaust after-treatment devices may be disposed in various orders and/or combinations along exhaust passage 235. For example, a diesel oxidation catalyst (DOC) 226 may be followed downstream by a selective catalytic reduction (SCR) catalyst 229. In some examples, a nitric oxides sensor (NOx sensor) 298 may be positioned downstream of the SCR, and may be configured to measure NOx concentration. SCR catalyst 229 may be followed downstream by a diesel particulate filter (DPF) 236. It should be understood that the emissions control devices of the exhaust system 225 shown in FIG. 2A are exemplary in nature. Various other emission control devices and configurations may be included in engine exhaust system 225. For example, exhaust system 225 may include an SCR catalyst followed by a DPF only. In another example, the exhaust system 225 may only include an SCR catalyst. In still another example, a DPF may be located upstream of the SCR catalyst, or a combined DPF/SCR catalyst may be used.

The engine exhaust system 225 may further include a reductant delivery and/or storage system, such as DEF system 238. The DEF may be a liquid reductant, such as a urea and water mixture, stored in a storage vessel, such as a storage tank. In one example, the DEF system 238 may include DEF tank 239 for onboard DEF storage, a DEF delivery line 240 that couples the DEF tank 239 to exhaust passage 235 via an injector at or upstream of SCR catalyst 229. The DEF tank 239 may be of various forms, and may include a filler neck 241 and corresponding cap and/or cover door in the vehicle body. Filler neck 241 may be configured to receive a nozzle for replenishing DEF.

DEF system 238 may also include a first DEF injector 243 in line 240 which injects DEF into the exhaust upstream of the SCR catalyst 229. First DEF injector 243 may be used to control the timing and amount of DEF injections, via control system 214. More specifically, first DEF injector 243 may include a first DEF injector valve 292. DEF injector valve 292 may be configured as an active solenoid valve that may be actuated open and closed via commands from control system 214, for example. DEF system 238 may further include DEF pump 246. DEF pump 246 may be used to pressurize and deliver DEF into line 240. DEF system 238 may further include a DEF line heater 247 which heats DEF line 240. For example, the DEF line heater 247 may warm the DEF fluid on the way to the DEF pump at low temperatures in order to maintain a DEF fluid viscosity. DEF line heater 247 may be a resistive heater, or various other configurations. DEF line heater 247 may be coupled to energy storage device 150, which may include a battery, and may be enabled and controlled via control system 214, for example.

It may be understood that by injecting DEF into hot exhaust gases upstream of the SCR, where the DEF includes a mixture of urea and water, the urea may decompose to ammonia ($NH_3$) in the hot exhaust gases and may be absorbed by the SCR device. The ammonia then reduces the NOx to nitrogen in the presence of the SCR catalyst. Thus, it may be understood that in some examples the NOx sensor may be used to infer when and how much DEF to inject into the exhaust in order to effectively reduce NOx emissions via populating the SCR with ammonia.

It will be appreciated that other components may be included in the engine such as a variety of valves and sensors. For example, a barometric pressure sensor 213 may be included in the engine intake. In one example, barometric pressure sensor 213 may be a manifold air pressure (MAP) sensor and may be coupled to the engine intake downstream of throttle 262. Barometric pressure sensor 213 may rely on part throttle or full or wide open throttle conditions, e.g., when an opening amount of throttle 262 is greater than a threshold, in order accurately determine BP.

A humidity sensor 258 may be positioned in the engine air intake, downstream of throttle 262. The humidity sensor may be positioned to determine the humidity of intake air flowing through intake passage 242, for example. In an example, humidity sensor 258 may measure the relative humidity and temperature of gas that the sensor is exposed to. Based on the relative humidity and temperature, the specific humidity of the gas may be determined (e.g. the amount of water per unit mass of gas flow). To measure the relative humidity, a dew point sensor (using a chilled mirror, for example) or a wet bulb/dry bulb sensor may be used. In other examples, the absolute humidity may be measured by a capacitance sensor, and the temperature and/or pressure of the air may be estimated or measured in order to calculate the relative and/or specific humidity.

In particular, engine control systems tend to want to know the specific humidity, for example the humidity ratio of the air. In other words, the engine control system wants to know how much of the air is water vapor (or some other diluent). Some engine humidity sensors measure the absolute humidity, for example the mass of water in a volume of air. In many cases, a humidity sensor may measure absolute humidity, convert it to relative humidity via selected measurements and assumptions, send the relative humidity data to the controller 212 which reconverts to absolute humidity, and then converts to specific humidity. To make such conversions, both pressure and temperature at the point of measurement may be measured or inferred. Accordingly, in some examples, barometric pressure sensor 213 and temperature sensor 260 may be included in close proximity to humidity sensor 258.

Engine system 208 may in some examples include an engine speed sensor 265. Engine speed sensor 265 may be attached to a crankshaft (not shown) of engine 110, and may communicate engine speed to the controller 212. Engine system 208 may in some examples include an engine torque sensor 267, and may be coupled to the crankshaft (not shown) of engine 110, to measure torque produced via the engine. In one example, the engine torque sensor may be utilized to indicate whether one or more engine cylinder(s) are functioning as desired, or if there are undesired issues with the engine cylinder(s), such as carbon deposits on the cylinder intake/exhaust valves, etc.

Engine system 208 may also include an exhaust gas recirculation (EGR) system 249 that receives at least a portion of an exhaust gas stream exiting engine 110 and returns the exhaust gas to engine intake manifold 244 downstream of throttle 262. Under some conditions, EGR system 249 may be used to regulate the temperature and/or dilution of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing. EGR system 249 is shown forming a common EGR passage 250 from exhaust passage 235 to intake passage 242.

In some examples, exhaust system 225 may also include a turbocharger (not shown) comprising a turbine and a compressor coupled on a common shaft. The turbine may be coupled within exhaust passage 235, while the compressor may be coupled within intake passage 242. Blades of the turbine may be caused to rotate about the common shaft as a portion of the exhaust gas stream discharged from the engine 110 impinges upon the blades of the turbine. The compressor may be coupled to the turbine such that the compressor may be actuated when the blades of the turbine are caused to rotate. When actuated, the compressor may then direct pressurized fresh air to air intake manifold 244 where it may then be directed to engine 110. In systems where EGR passage 250 is coupled to engine exhaust 225 upstream of the turbine and coupled to intake passage 242 downstream of the compressor, the EGR system may be considered a high pressure EGR system. The EGR passage may alternatively be coupled downstream of the turbine and upstream of the compressor (low pressure EGR system). It may be understood that the systems and methods discussed herein may apply to either a high pressure EGR system or a low pressure EGR system, without departing from the scope of this disclosure.

An EGR valve 253 may be coupled within EGR passage 250. EGR valve 253 may be configured as an active solenoid valve that may be actuated to allow exhaust gas flow into intake manifold 244. The portion of the exhaust gas flow discharged by engine 110 that is allowed to pass through EGR system 249 and return to engine 110 may be metered by the measured actuation of EGR valve 253, which may be regulated by controller 212. The actuation of EGR valve 253 may be based on various vehicle operating parameters and a calculated overall EGR flow rate.

One or more EGR coolers 254 may be coupled within EGR passage 250. EGR cooler 254 may act to lower the overall temperature of the EGR flow stream before passing the stream on to intake manifold 244 where it may be combined with fresh air and directed to engine 110. EGR passage 250 may include one or more flow restriction regions 255. One or more pressure sensors 256 may be coupled at or near flow restriction region 255. The diameter of the flow restriction region ma thus be used to determine an overall volumetric flow rate through EGR passage 250.

An air intake system hydrocarbon trap (AIS HC) 257 may be placed in the intake manifold of engine 110 to adsorb fuel vapors emanating from unburned fuel in the intake manifold, puddled fuel from degraded fuel injectors and/or fuel vapors in crankcase ventilation emissions during engine-off periods. The AIS HC may include a stack of consecutively layered polymeric sheets impregnated with HC vapor adsorption/desorption material. Alternately, the adsorption/desorption material may be filled in the area between the layers of polymeric sheets. The adsorption/desorption material may include one or more of carbon, activated carbon, zeolites, or any other HC adsorbing/desorbing materials. When the engine is operational causing an intake manifold vacuum and a resulting airflow across the AIS HC 257, the trapped vapors may be passively desorbed from the AIS HC and combusted in the engine 110. Thus, during engine operation, intake fuel vapors are stored and desorbed from AIS HC 257. In addition, fuel vapors stored during an engine shutdown can also be desorbed from the AIS HC during engine operation. In this way, AIS HC 257 may be continually loaded and purged, and the trap may reduce evaporative emissions from the intake passage even when engine 110 is shut down.

Fuel system 218 may include a fuel tank 220 coupled to a fuel pump system 221. It may be understood that fuel tank 220 may comprise the same fuel tank as fuel tank 144 depicted above at FIG. 1. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261. In some examples the FTIV may not be included, whereas in other examples, an FTIV may be included.

Fuel system 218 may be operated by controller 212 in a plurality of modes by selective adjustment of the various valves and solenoids. It may be understood that control system 214 may comprise the same control system as control system 190 depicted above at FIG. 1. For example, the fuel system may be operated in a fuel vapor storage mode (e.g., during a fuel tank refueling operation and with the engine not combusting air and fuel), wherein the controller 212 may open isolation valve 252 (when included) while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252 (when included), while maintaining canister purge valve 261 closed, to depressurize the fuel tank before allowing enabling fuel to be added therein. As such, isolation valve 252 (when included) may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252 (when included). Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, pressure sensor 282, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 4-6.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode. In other examples, the controller may need to be awake in order to conduct such methods. In such an example, the controller may stay awake for a duration referred to as a time period where the controller is maintained awake to perform extended shutdown functions, such that the controller may be awake to conduct diagnostic routines. In another example, a wakeup capability may enable a circuit to wake the controller when a diagnostic is requested (e.g. when a humidity sensor diagnostic is requested, or when conditions are met for conducting such a diagnostic).

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

Turning now to FIG. 2B, an example of vehicle system 293 is illustrated. It may be understood that most components of vehicle system 293 at FIG. 2B are the same as those depicted for vehicle system 206 depicted at FIG. 2A. Thus, components that are the same between FIG. 2A and FIG. 2B are illustrated by the same numerals, and will not be reiterated here for brevity.

In the example vehicle system 293 of FIG. 2B, the engine exhaust system may include DEF system 238B, as discussed above. DEF system 238B may comprise the same components as DEF system 238 discussed at FIG. 2A, with the exception being that DEF system 238B may further include a second DEF delivery line 294, stemming from DEF delivery line 240. Second DEF delivery line 294 may couple DEF tank 239 to intake manifold 244 via second DEF injector 295. Second DEF injector 295 may include a second DEF injector valve 296, which may be configured as an active solenoid valve that may be actuated open and closed via commands from control system 214, for example. Thus, as will be discussed in detail below, there may be vehicle operating conditions or circumstances where it may be beneficial to inject DEF into the intake manifold. Alternatively, there may be other circumstances where it may be beneficial to inject DEF into exhaust passage 235. Importantly, it may be understood that in a case such as FIG. 2B, where DEF may be injected into the intake manifold 244 and/or exhaust passage 235, DEF may be injected into the intake manifold without also injecting DEF into exhaust passage 235. Alternatively, DEF may be injected into the exhaust passage 235 without also injecting DEF into intake manifold 244. Still further, there may be some examples where DEF may be injected into both intake manifold 244 and exhaust passage 235 at the same time, or nearly the same time. Detailed examples for injecting DEF into one or more of the intake manifold 244 and/or exhaust passage 235 for conducting particular diagnostic procedures will be discussed below with regard to FIGS. 4-6.

Briefly, in one example, DEF may be injected into the intake manifold 244 while the engine is combusting air and fuel in order to draw DEF into one or more cylinders of the engine such that carbon deposits (e.g. on top of a cylinder piston, or on intake/exhaust valves) may be cleaned. In some examples, while the DEF is being drawn into the one or more cylinders of the engine, an air/fuel ratio may be adjusted to a rich air/fuel ratio, to compensate for the injected DEF. Importantly, such cleaning of carbon deposits may be conducted onboard and on demand. More specifically, as discussed, the DEF may comprise a mixture of urea and water (urea component and a water component). Thus, when a mixture of fuel, air, and DEF is introduced into one or more engine cylinders and is ignited, the water component of DEF may turn to steam (e.g. become vaporized), which may effectively clean out the carbon deposits. The DEF may be injected into the intake manifold during an engine idle condition. The engine idle condition may in some examples include a key-off event where the controller is maintained in an awake state to reduce the carbon buildup, and where the controller is put to sleep subsequent to completion of the test. In such an example, it may be understood that the DEF injected into the intake manifold may comprise a threshold amount less than the amount of fuel provided to the engine during the injecting the DEF into the intake manifold.

Another example includes a method comprising, in a first operating condition of the vehicle, including an indication of degradation of one or more cylinders of an engine and a lack of degradation indicated in an EGR system, injecting DEF into an intake manifold of an engine with an exhaust gas recirculation valve closed to mitigate the degradation of the one or more cylinders. In a second operating condition of the vehicle, including an indication of degradation in the EGR system, and either a lack of degradation in the one or more cylinders and/or the indication of degradation in the one or more cylinders of the engine, injecting the diesel exhaust fluid into the intake manifold of the engine with the EGR valve open, to mitigate the degradation of the exhaust gas recirculation system. In the first operating condition, DEF is injected into the intake manifold while the engine is combusting air and fuel, and may further include stopping injecting DEF into the intake manifold in response to an indication that degradation of the one or more engine cylinders has been mitigated, which may include an indication that carbon buildup associated with the one or more engine cylinders has been reduced or removed. In the second operating condition, the DEF may be injected into the intake manifold while the engine is rotated unfueled in a forward direction for a predetermined duration. Once the predetermined duration elapses, the engine may be activated to combust air and fuel, with one cylinder not receiving fuel, and maintaining the injecting the DEF into the intake manifold with the EGR valve open while the engine is combusting air and fuel. The DEF may be stopped being injected, and the EGR valve may be closed in response to an indication that the degradation in the EGR system has been mitigated. Mitigating the degradation in the EGR system may include reducing or removing carbon buildup in the EGR passage of the EGR system and/or removing carbon buildup associated with the EGR valve. In such an example, in the second condition, it may be understood that the one engine cylinder not receiving fuel does not comprise the one or more cylinders of the engine with the indicated degradation. It may be understood that, discussed herein, the indication of degradation in the EGR system is in response to a flow in the EGR system being below a desired flow under predetermined vehicle operating conditions when the EGR valve is open, and/or in response to the flow in the EGR system being above the desired flow under conditions where the EGR valve is closed.

In another example, consider a condition where EGR flow is lower than expected or desired. Such low flow EGR may be due to carbon deposits on an EGR valve (e.g. 253) or in an EGR passage (e.g. 250). In such an example, DEF may be injected into the intake manifold while the engine is being spun unfueled (e.g. without combustion of air and fuel) in a forward or default direction, with the EGR valve open to route liquid DEF into an EGR passage (e.g. 250). Subsequent to routing the DEF into the EGR passage, the engine may be activated to combust air and fuel, such that heat may be generated in the exhaust and EGR passage. With the EGR valve open, heating the DEF via operating the engine to combust air and fuel may result in steam from the water component of the DEF effectively cleaning off the carbon deposits associated with the EGR valve. In other words, subsequent to routing the diesel exhaust fluid to the EGR system (e.g. routed to the EGR passage), the engine may be operated to vaporize the DEF routed to the EGR system. Furthermore, when the engine is activated to combust air and fuel, one engine cylinder may not be activated (no fueling provided to the deactivated cylinder), and thus the one deactivated engine cylinder may serve as a route for directing DEF into the EGR passage, where the DEF is continued to be injected into the intake manifold after the engine is activated to combust air and fuel. Such an example may include conditions where an oxidation catalyst (e.g. 226) is above a threshold temperature (where the threshold temperature may comprise a temperature at which point any DEF routed across the oxidation catalyst may become vaporized).

In another example, a third operating condition of the vehicle may include injecting DEF into the intake manifold of the engine of the vehicle, and routing the DEF to the EGR system, and a fourth operating condition may include injecting DEF into an exhaust passage of the vehicle, and routing the DEF to the EGR system. In such an example, both the third and fourth operating conditions may include vaporizing the DEF responsive to routing the DEF to the EGR system. In such an example, the third operating condition may include a temperature of an oxidation catalyst (e.g. 226) positioned upstream of an injection site for injecting the DEF into the exhaust passage being greater than a threshold temperature, where the fourth operating condition may include a temperature of the oxidation catalyst below the threshold temperature. In such an example, the threshold temperature may include a temperature at which point DEF routed across the oxidation catalyst results in vaporization of the DEF. In this example, in the third operating condition, the engine may be rotated unfueled in a forward direction, whereas in the fourth operating condition, the DEF may be routed to the EGR system via rotating the engine unfueled in a reverse direction. In both the third condition and the fourth condition, vaporizing the DEF includes activating the engine to combust air and fuel, to direct engine exhaust heat to the EGR system. Furthermore, the third operating condition may include a key-off event, whereas the fourth operating condition may include a key-on event.

In another example, a fifth operating condition may include a condition where a carbon buildup is indicated in the EGR system, and where temperature of an oxidation catalyst (e.g. 226) is greater than a threshold, and a sixth operating condition may include a condition where carbon buildup is indicated in the EGR system, where temperature of the oxidation catalyst is less than the threshold temperature. In the fifth operating condition, the engine may be operated in one mode to reduce the carbon buildup via injecting DEF into the intake manifold, and routing the DEF to the EGR system, whereas in the sixth operating condition, the engine may be operated in another mode to reduce the carbon buildup via injecting DEF into the exhaust passage, and routing the DEF to the EGR system. In such an example, the one mode (fifth operating condition) may include rotating the engine unfueled via a motor in the forward direction while the DEF is being injected into the intake manifold, while the other mode (sixth operating condition) includes rotating the engine unfueled via the motor in the reverse direction while the DEF is being injected into the exhaust passage. In both the fifth and sixth operating conditions, the EGR valve may be commanded open. Furthermore, in both the fifth and sixth operating conditions, responsive to the DEF being routed to the EGR system, vaporizing the DEF to reduce the carbon buildup, via activating the engine to combust air and fuel. In the fifth operating condition, one cylinder may be maintained deactivated, whereas in the sixth operating condition, all cylinders may be activated to combust air and fuel. Furthermore, in the fifth condition, DEF may be continued to be injected into the intake manifold while the engine is combusting air and fuel.

In another example where EGR flow is lower than expected or desired under conditions where an EGR valve is open, or greater than expected under conditions where an EGR valve is closed, another method may be used to clean carbon deposits from the EGR valve (e.g. 253). Such a method may in some examples be used responsive to a situation where the vehicle is not equipped with a DEF line for enabling DEF injection into the intake manifold (e.g. 244), but where DEF may be injected into the exhaust passage (e.g. 335), as depicted at FIG. 2A. In such an example, liquid DEF may be injected into the exhaust passage, and routed to the EGR passage (e.g. 250), via spinning the engine unfueled (e.g. without combusting air and fuel) in reverse. More specifically, by spinning the engine in reverse, a vacuum may be generated in the exhaust system, while a pressure may be generated in the intake manifold. For example, as the engine spins in reverse, the opening of a cylinder exhaust valve (not shown) brings fresh air (and exhaust gas if present) into the cylinder, and a subsequent opening of the cylinder intake valve (not shown) evacuates the cylinder to the intake manifold. If the EGR valve (e.g. 253) is open, then liquid DEF may be routed to the EGR passage. Once liquid DEF is present in the EGR passage, the engine may be activated to combust air and fuel, and where the engine spins in the default direction. By operating the engine to combust air and fuel, hot exhaust may be routed to the EGR passage where the water content of the DEF may be vaporized, which may serve to clean carbon deposits from the EGR valve.

In another example, a method may comprise in a seventh operating condition, injecting DEF into the exhaust passage of the vehicle to populate the SCR catalyst positioned in the exhaust passage with ammonia, and in an eighth operating condition, injecting the DEF into the exhaust passage of the engine of the vehicle to reduce carbon buildup in the EGR system. In such an example, the seventh operating condition may include a temperature of an oxidation catalyst (e.g. 226) positioned upstream of an injection site for injecting the DEF into the exhaust passage either above or below a threshold temperature (the threshold temperature comprising a temperature where, above the threshold DEF routed across the oxidation catalyst may become vaporized). The eight operating condition may include a condition where temperature of the oxidation catalyst is below the threshold temperature. In this example, the seventh operating condition may include the engine combusting air and fuel during the injecting of DEF, whereas the eighth operating condition may include the engine not combusting air and fuel during the injecting. Furthermore, the eighth operating condition may include rotating the engine in the reverse direction for a predetermined duration during the injecting to route the DEF into the EGR system, and in response to the predetermined duration elapsing, stopping rotating the engine in the reverse direction, and activating the engine to combust air and fuel. In some examples, speed (RPM) of the engine may be increased and/or an amount of DEF injected into the exhaust passage may be increased as a condensate level stored in an EGR cooler positioned in the EGR system decreases, or vice versa. Still further, the seventh operating condition may be independent of whether the EGR valve is open or closed, whereas the eighth operating condition may include the EGR valve being commanded open just prior to (within 2 seconds or less), or concomitant with the injecting the DEF into the exhaust passage. In some examples the EGR valve may be commanded open just subsequent (within 2 seconds or less) to injecting the DEF into the exhaust passage.

In yet another example, a ninth operating condition may include a key-on event and an indication of carbon buildup in the EGR system, where the ninth operating condition may include commanding open the EGR valve, duty cycling a first DEF injection valve (e.g. 292) and rotating the engine unfueled in reverse as a function of a condensate level in the EGR cooler (e.g. increasing engine speed and/or increasing the duty cycle of the injecting as condensate level decreases, or decreasing engine speed and/or decreasing the duty cycle of the injecting as condensate level increases). Such actions may route DEF to the EGR system, where, after a predetermined duration of the routing, the ninth operating condition may include stopping duty cycling the first DEF injection valve, and stopping rotating the engine unfueled in reverse, and activating the engine to combust air and fuel in order to vaporize the DEF routed to the EGR system. In a tenth operating condition, the first DEF injection valve may be duty cycled with the engine combusting air and fuel, to populate the SCR catalyst with ammonia. The ninth operating condition may include temperature of the oxidation catalyst below the threshold temperature, whereas the tenth operating condition may be independent of the temperature of the oxidation catalyst.

In each of the above examples, it may be understood that when the engine is spun in a forward direction unfueled, that may comprise a default direction, or the same direction that the engine spins when combusting air and fuel. In such a case, a vacuum may be generated in the intake manifold of the engine, while a pressure may be generated in the exhaust system. Alternatively, when the engine is spun unfueled in reverse, a vacuum may be generated in the exhaust system of the engine, while a pressure may be generated in the intake manifold.

The above-mentioned example methods will be described in detail below with regard to the methods depicted at FIGS. 4-6.

As discussed, the above-mentioned example methods may include spinning the engine unfueled in a forward (e.g. default) or reverse direction. To spin the engine in the forward or reverse direction unfueled, a vehicle motor (e.g. 120) may be employed, using power supplied via the energy storage device (e.g. 150), such as a battery.

Accordingly, turning to FIGS. 3A-3B, they show an example circuit 300 that may be used for reversing a spin orientation of an electric motor. Circuit 300 schematically depicts an H-Bridge circuit that may be used to run a motor 310 in a first (forward) direction and alternately in a second (reverse) direction. Circuit 300 comprises a first (LO) side 320 and a second (HI) side 330. Side 320 includes transistors 321 and 322, while side 330 includes transistors 331 and 332. Circuit 300 further includes a power source 340.

In FIG. 3A, transistors 321 and 332 are activated (energized), while transistors 322 and 331 are off. In this confirmation, the left lead 351 of motor 310 is connected to power source 340, and the right lead 352 of motor 310 is connected to ground. In this way, motor 300 may run in a forward direction. When operating the engine in a forward direction via the motor, the engine may be in a cranking mode for initial combustion commencement. Additionally and/or alternatively, when operating the engine in a forward direction via the motor, the engine (and motor or another motor) may be in a drive mode to drive the vehicle. It may be understood that in some examples, the engine may be spun in the forward (e.g. default) direction under conditions where the vehicle is stationary and it is desired only for the engine to be spun or rotated in the forward direction, without combustion.

In FIG. 3B, transistors 322 and 331 are activated (energized), while transistors 321 and 332 are off. In this confirmation, the right lead 352 of motor 310 is connected to power source 340, and the left lead 351 of motor 310 is connected to ground. In this way, motor 310 may run in a reverse direction.

Turning now to FIG. 4, a high-level flow chart for an example method 400 for conducting a procedure to remove carbon deposits from one or more cylinders of a vehicle engine, is shown. More specifically, method 400 may include injection of diesel exhaust fluid (DEF) into an intake manifold of the engine, while the engine is combusting air and fuel. The DEF injected into the intake manifold may thus be drawn into the engine, where the water component of DEF may become vaporized, thus cleaning the carbon deposits.

Method 400 will be described with reference to the systems described herein and shown in FIGS. 1-3B, though it should be understood that similar methods may be applied to other systems without departing from the scope of this disclosure. Method 400 may be carried out by a controller, such as controller 212 in FIGS. 2A-2B, and may be stored at the controller as executable instructions in non-transitory memory. Instructions for carrying out method 400 and the rest of the methods included herein may be executed by a controller based on instructions stored on a memory of the controller and in conjunction with signals received from sensors of the engine system, such as the sensors described above with reference to FIGS. 1 and 2A-2B. The controller may employ actuators of the vehicle system such as second DEF injection valve (e.g. 296), motor (e.g. 120), fuel injector(s) (e.g. 266), air intake throttle (e.g. 262), etc., according to the methods described below.

Method 400 begins at 402 and may include estimating and/or measuring current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 404, method 400 may include indicating whether conditions are met for conducting a cylinder decarbonization diagnostic procedure. Conditions being met for conducting the cylinder decarbonization diagnostic procedure may include an onboard power balance test that has indicated sluggish engine performance, indicative of one or more engine cylinders having accumulated carbon deposits, for example. Conditions being met at 404 may additionally or alternatively include a cylinder compression test that has indicated sluggish engine performance. Conditions being met at 404 may in some examples include a key-off condition, where sluggish engine performance has been indicated via the power balance test and/or the cylinder compression test. Conditions being met at 404 may additionally or alternatively include a threshold duration of time (e.g. 1 day, 2 days, 5 days, 10 days, or greater than 10 days but less than 30 days) passing since a prior cylinder decarbonization diagnostic. Conditions being met at 404 may additionally or alternatively include an indication that a level of DEF in the DEF storage tank (e.g. 241) is greater than a predetermined threshold (e.g. >10%, >20%, or >30% full). If, at 404, it is indicated that conditions are not met for conducting the cylinder decarbonization diagnostic, method 400 may proceed to 406. At 406, method 400 may include maintaining current vehicle operating parameters. For example, if the vehicle is in operation with the engine running and a key-off event is not indicated, then current engine operating parameters may be maintained. In another example, if the vehicle is being propelled at least in part via electrical energy derived from the onboard energy storage device, then electric operation may be maintained. Such examples are illustrative. Method 400 may then end.

Returning to 404, if conditions are indicated to be met for conducting the cylinder decarbonization diagnostic, method 400 may proceed to 408. At 408, method 400 may include commanding or maintaining the engine combusting air and fuel. For example, in a case where the vehicle was operating in an electric-only mode of operation at key-off, where conditions were indicated to be met for conducting the cylinder decarbonization diagnostic, then the engine may be activated, or pulled up, at 408 to begin combusting air and fuel. In a case where the engine is already combusting air and fuel, then combustion may be maintained at step 408. Furthermore, at 408, engine speed may be controlled to a desired engine speed. The desired engine speed may be achieved via the controller (e.g. 212) commanding engine system actuators such as fuel injectors (e.g. 266), throttle (e.g. 262) position, etc., to control engine speed to the desired speed. Still further, at 408, method 400 may include maintaining the controller awake, such that the cylinder decarbonization procedure may be conducted.

Proceeding to 410, method 400 may include duty cycling the second DEF injector valve (e.g. 296). Specifically, by duty cycling the second DEF injector valve, DEF fluid may be drawn from the DEF tank (e.g. 239), and into the intake manifold (e.g. 244) of the engine (e.g. 110). DEF fluid may be drawn from the DEF tank as a result of engine vacuum drawing DEF fluid from the DEF tank, where engine vacuum may result due to the engine being operated in the default direction (e.g. forward direction). It may be understood that duty cycling the second DEF injector valve may comprise the controller sending a signal to the second DEF injector valve, commanding or actuating the second DEF injector valve to open and close. The second DEF injector valve may be duty cycled in a fashion whereby the amount of DEF injected into the intake manifold at each opening of the second DEF injector valve is a threshold quantity less than fuel injected at each fuel injection into individual engine cylinders. For example, the threshold quantity may include 3-fold less DEF than fuel, between 3-fold less and 10-fold less DEF than fuel, between 10-fold less and 100-fold less DEF than fuel, or greater than 100-fold less DEF than fuel.

Proceeding to 412, method 400 may include monitoring engine speed. Engine speed may be monitored, for example, via an engine speed sensor (e.g. 265). Engine speed may be monitored while the engine is combusting air and fuel, and while DEF is being injected into the intake manifold. Proceeding to 414, method 400 may include indicating whether engine speed decreases below a threshold engine speed. The threshold engine speed may comprise an engine speed slightly above (e.g. 100, 200, or 500 RPM above) an engine stall speed, for example. If, at 414, it is indicated that engine speed has decreased below the threshold engine speed, method 400 may proceed to 416, and may include increasing engine speed above the threshold engine speed to the desired engine speed (as discussed above at step 408 of method 400). More specifically, the throttle (e.g. 262) may be commanded to a more open position, to allow for more intake air flow to the engine, which may allow for an increased engine speed. In some examples, fuel injection to one or more engine cylinders may additionally or alternatively be increased, to increase engine speed to the desired engine speed.

If engine speed was not indicated to be below the threshold engine speed at step 414, or if engine system actuators have controlled engine speed to the desired engine speed at 416, method 400 may proceed to 418. At 418, method 400 may include indicating whether carbon deposits have been removed from engine cylinders. Such an indication may be provided via the onboard power balance test, discussed above. In other words, the controller may run an onboard power balance test while the engine is activated to combust air and fuel, while DEF is being injected to the intake manifold, and while engine speed is controlled to the desired engine speed. With DEF being injected into the intake manifold, the DEF may be drawn into engine cylinders, and when fuel is ignited in the engine cylinders, the water component of DEF may vaporize into steam, which may effectively clean (e.g. decarbonize) the engine cylinder(s). The onboard power balance test may thus be utilized to indicate whether the engine cylinder(s) have been effectively cleaned. More specifically, the power balance test may include measuring engine torque via a torque sensor (e.g. 267). The power balance test may indicate that one or more engine cylinders are not functioning as desired (e.g. torque production by a particular cylinder is lower than torque produced via the other engine cylinders). Thus, at 418, responsive to an indication that one or more engine cylinder(s) are still not functioning as desired, method 400 may proceed to 419, and may include indicating whether a predetermined duration of time has elapsed. For example, the predetermined duration of time may comprise a duration for which carbon deposits are expected to be removed from one or more engine cylinders, if the carbon deposits are the reason for the sluggish engine performance (e.g. one or more engine cylinder(s) not functioning as desired). The predetermined duration may comprise one minute, between one minute and two minutes, between two minutes and three minutes, between three minutes and five minutes, or greater than five minutes, for example. If, at 419, the predetermined duration has not elapsed, method 400 may return to 408 and may include continuing to operate the engine to combust air and fuel, with DEF injection into the intake manifold.

Alternatively, at 419, if the predetermined duration of time has elapsed, method 400 may proceed to 421, and may include indicating engine degradation. More specifically, a flag may be set at the controller indicating that a cylinder decarbonization test diagnostic was conducted, and that the test diagnostic was not able to correct the issue related to the one or more engine cylinder(s) not functioning as desired. Furthermore, a malfunction indicator light (MIL) may be illuminated on the vehicle dash, alerting a vehicle operator of the need to service the vehicle.

Proceeding to 423, method 400 may include stopping duty cycling the second DEF injection valve. With the second DEF injection valve commanded or actuated OFF via the controller, engine intake manifold vacuum may thus no longer draw DEF into the intake manifold. Proceeding to 425, the engine may be deactivated, or turned OFF. For example, fuel injection may be commanded/actuated to stop via the controller sending a signal to the fuel injector(s) (e.g. 266), and spark (if the engine includes spark plugs for providing spark to individual cylinders) provided to individual engine cylinders may be discontinued.

Proceeding to 427, method 400 may include updating vehicle operating parameters. For example, vehicle operating parameters may be adjusted/updated to compensate for the indicated engine degradation. In one example where the vehicle system comprises a hybrid electric vehicle capable of operating in an electric-only mode, the vehicle may be commanded to operate as frequently as possible in the electric-only mode of operation, to avoid further degradation of the engine.

Proceeding to 429, method 400 may include sleeping the controller, as the cylinder decarbonization diagnostic routine has ended. Method 400 may then end.

Returning to 418, responsive to an indication that carbon deposits have been removed from engine cylinders, as indicated via the onboard power balance test, method 400 may proceed to 431. More specifically, the power balance test may indicate that carbon deposits have been removed from engine cylinders responsive to torque production by all engine cylinders within a threshold (e.g. within 5%) of desired or expected torque production. The desired or expected torque production may comprise a level of torque produced at a particular engine speed (e.g. RPM), where there is an absence of carbon deposits at the engine cylinder(s). At 431, method 400 may include stopping duty cycling the second DEF injection valve. With the second DEF injection valve commanded or actuated OFF via the controller, engine intake manifold vacuum may thus no longer draw DEF into the intake manifold. Proceeding to 433, the engine may be deactivated, or turned OFF. For example, fuel injection may be commanded/actuated to stop via the controller sending a signal to the fuel injector(s) (e.g. 266), and spark provided to individual engine cylinders may be discontinued (if the engine includes spark plugs for providing spark to individual cylinders).

Proceeding to 435, method 400 may include updating vehicle operating parameters. For example, vehicle operating parameters may be adjusted/updated to compensate for the indicated lack of carbon deposits on the cylinder(s). A flag may be set at the controller to indicate that the cylinder decarbonization test diagnostic was conducted, and was successful in restoring engine cylinder torque production to the desired or expected torque production.

Proceeding to 437, method 400 may include sleeping the controller, as the cylinder decarbonization diagnostic routine has ended. Method 400 may then end.

While the above example method 400 depicts a method to remove carbon deposits from one or more engine cylinders in an onboard and on-demand fashion, there may in some examples be other components of the engine which may benefit from decarbonization techniques or methodology. Specifically, the EGR system (e.g. 249) may recirculate exhaust gases back into the intake system, to reduce nitric oxides (NOx) emissions. Over time, soot and other carbon materials may build up on the EGR system, and may either clog it or may cause an EGR valve (e.g. 253) to become stuck open or stuck closed. Thus, similar to that discussed above for cleaning carbon deposits from one or more engine cylinders, a method or methods are desirable that may clean carbon deposits from an EGR system (e.g. 249).

Thus, turning now to FIG. 5, a high-level flow chart for an example method 500 for conducting a procedure to remove carbon deposits from an EGR system, is shown. More specifically, method 500 may include injection of DEF into the intake manifold (e.g. 244) of the engine, while the engine is being spun in a forward or default direction and with the EGR valve open, to route DEF into the EGR passage. After a predetermined duration of routing DEF into the EGR passage, the engine may be activated to combust air and fuel, with one cylinder deactivated (not receiving fuel injection). The DEF may thus continue to be routed to the EGR passage, and heat from combustion may vaporize the water component of the DEF into steam, which may effectively clean the EGR passage of carbon deposits. Importantly, such a method comprises an onboard and on-demand EGR cleaning methodology.

Method 500 will be described with reference to the systems described herein and shown in FIGS. 1-3B, though it should be understood that similar methods may be applied to other systems without departing from the scope of this disclosure. Method 500 may be carried out by a controller, such as controller 212 in FIGS. 2A-2B, and may be stored at the controller as executable instructions in non-transitory memory. Instructions for carrying out method 500 and the rest of the methods included herein may be executed by a controller based on instructions stored on a memory of the controller and in conjunction with signals received from sensors of the engine system, such as the sensors described above with reference to FIGS. 1 and 2A-2B. The controller may employ actuators of the vehicle system such as second DEF injection valve (e.g. 296), motor (e.g. 120), fuel injector(s) (e.g. 266), air intake throttle (e.g. 262), EGR valve (e.g. 253), etc., according to the methods described below.

Method 500 begins at 502, and may include estimating and/or measuring current vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 504, method 500 may include indicating whether conditions are met for conducting an EGR cleaning diagnostic. Conditions being met for conducting the EGR cleaning diagnostic may include an indication of low EGR flow, as monitored via a pressure sensor (e.g. 256) in the EGR passage (e.g. 250). For example, an expected amount of EGR flow in the absence of carbon deposits associated with the EGR valve and/or in the EGR passage may be stored at the controller in the form of a lookup table, comprising expected flow rates at various engine speeds and/or other operating conditions. Low EGR flow may comprise a level of EGR flow that differs from an expected EGR flow for a particular engine operating condition, by a threshold, for example differing by greater than 5%, or differing by greater than 10%. In another example, conditions being met for conducting the EGR cleaning diagnostic may include an indication of a degraded EGR system, evidenced by, for example, a rough idle or in some examples a stall condition.

Conditions being met may additionally or alternatively include a key-off condition, where low flow is indicated in the EGR passage, or where the EGR system is indicated to be degraded. In some examples, conditions being met at 504 may additionally or alternatively include an indication that a threshold duration (e.g. 1 day, 2 days, 5 days, 10 days, 15 days, greater than 20 days but less than 30 days, etc.) has elapsed since a prior EGR cleaning diagnostic. Conditions being met at 504 may additionally or alternatively include an indication that an amount of DEF stored in the DEF tank (e.g. 241) is greater than a predetermined threshold (e.g. >10%, >20%, or >30% full).

If, at 504, conditions are not indicated to be met for conducting the EGR cleaning diagnostic, method 500 may proceed to 506. At 506, method 500 may include maintaining current vehicle operating parameters. For example, if the vehicle is in operation with the engine running, such operation may be maintained. Alternatively, if the vehicle is in operation, where the vehicle is being propelled, either fully or in part, via electrical power, such operating conditions may be continued. Method 500 may then end.

Returning to 504, responsive to conditions being indicated to be met for conducting the EGR cleaning diagnostic, method 500 may proceed to 507. At 507, method 500 may include commanding open the EGR valve (e.g. 253). For example, the controller may send a signal to the EGR valve, actuating it open. Proceeding to 508, method 500 may include spinning the engine unfueled in the default, or forward direction. Specifically, the motor (e.g. 120) may be commanded via the controller, to rotate or spin the engine unfueled in the default direction. In some examples, spinning the engine unfueled may include spinning the engine unfueled at a predetermined engine speed (engine RPM).

Proceeding to 510, method 500 may include duty cycling the second DEF injection valve (e.g. 296). Duty cycling the second DEF injection valve may comprise duty cycling the second DEF injection valve so as to add a predetermined amount of DEF within a predetermined duration. Accordingly, proceeding to 512, method 500 may include indicating whether the predetermined duration has elapsed. If the predetermined duration has not yet elapsed, method 500 may return to 508, and may include continuing to spin the engine unfueled in the default direction, and may further include continuing to duty cycle the second DEF injection valve. Alternatively, responsive to the predetermined duration elapsing at 512, method 500 may proceed to 514.

It may be understood that, by injection of DEF into the intake manifold via the second DEF injection valve and with the engine being spun unfueled with the EGR valve open, DEF may be drawn through the engine, and into the EGR passage (e.g. 250).

At 514, method 500 may include activating the engine to combust air and fuel. For example, the motor may be deactivated, and engine cylinder(s) may be provided with fuel injection (and spark if the engine includes spark plugs for providing spark to individual cylinders). Fuel (and spark if applicable) may be controlled via the controller, to control engine speed to a desired speed. Furthermore, at 514, activating the engine to combust air and fuel may include providing fuel (and spark where applicable) to all engine cylinders except one. The cylinder that does not receive fuel (and spark where applicable) may be termed a deactivated cylinder, but it may be understood that the deactivated cylinder still functions to open intake and exhaust valves associated with the deactivated cylinder, while the engine is otherwise combusting air and fuel. Still further, at 514, the spark provided to all cylinders but the deactivated cylinder may comprise retarded spark, which may serve to increase an amount of heat delivered to the exhaust manifold and EGR passage, as compared to a situation where spark is not retarded. However, it may be understood that in a diesel vehicle, spark may not be provided. It may be further understood that the one deactivated cylinder may comprise a route for the DEF to be delivered to the EGR passage to be vaporized (in addition to the DEF already routed to the EGR passage while the engine was spun unfueled). Furthermore, while not explicitly shown, an exhaust tuning valve (e.g. 299) may be controlled to a position where heat from the engine is effectively routed to the EGR passage. For example, the exhaust tuning valve may be controlled to a fully closed conformation in some examples, or may be mostly closed (e.g. 20% open or less), etc., such that engine exhaust heat is routed to the EGR passage.

Accordingly, proceeding to 516, method 500 may include maintaining duty cycling the second DEF injection valve. The duty cycling of the second DEF injection valve at 516 may in some examples comprise the same rate of duty cycling the second DEF injection valve as was conducted at step 510 of method 500. In other examples, duty cycling the second DEF injection valve at 516 may comprise duty cycling the second DEF injection valve at a rate greater than, or less than, the rate of duty cycling conducted at 510. As discussed, with the one cylinder deactivated, DEF may be routed to the exhaust manifold and EGR passage to be vaporized. The vaporization of the DEF may thus convert the water component of DEF to steam, which may serve to clean any deposits in the EGR passage and/or associated with the EGR valve.

Proceeding to 518, method 500 may include maintaining engine speed at the desired engine speed. For example, while DEF is being injected in the intake manifold, even though there is the deactivated cylinder which may route DEF to the exhaust manifold and EGR passage, DEF may be additionally introduced into combusting cylinders, which may in some examples result in engine speed dropping. Thus, to prevent a potential stall condition, engine speed may be maintained at the desired speed via controlling a position of a throttle (e.g. 262). For example, responsive to a dip in engine RPM, the throttle may be commanded to a more open position, to enable additional air to be drawn into the intake, thus controlling engine speed to the desired engine speed. Furthermore, at 518, method 500 may include controlling the engine to maintain a desired engine intake manifold vacuum, to enable the DEF to be drawn through the engine to the exhaust manifold and EGR passage. To maintain the desired engine intake manifold vacuum, fuel injection, throttle position, spark (where applicable), etc., may be controlled such that the desired intake manifold vacuum is maintained.

Proceeding to 520, method 500 may include indicating whether carbon deposits are indicated as being removed from the EGR valve and/or EGR passage. Specifically, at 520, method 500 may include monitoring pressure in the EGR passage, and indicating whether EGR flow for the particular engine operating condition (e.g. desired engine speed) is within the threshold (e.g. within 5%) of expected EGR flow (e.g. condition of an absence of carbon deposits in the EGR passage and/or associated with the EGR valve). As discussed above, a lookup table stored at the controller may include expected EGR flow as a function of engine operating conditions, and accordingly, such a lookup table may be queried via the controller at 520 in order to indicate whether the carbon deposits have been removed from the EGR valve/EGR passage.

If, at 520, it is indicated that EGR flow is within the threshold of expected EGR flow if the carbon deposits had been removed, method 500 may proceed to 522. In other words, responsive to an indication that the carbon deposits have been removed, method 500 may proceed to 522. At 522, method 500 may include commanding the EGR valve to a closed position, and may further include stopping injection of DEF into the intake manifold. More specifically, the second DEF injection valve may be commanded closed, such that the duty cycling of the second DEF injection valve is stopped and DEF is no longer injected into the intake manifold.

Proceeding to 524, method 500 may include maintaining the engine activated at the desired speed for a predetermined duration. Specifically, the engine may be maintained in operation combusting air and fuel in order to force any removed carbon deposits to exit the exhaust. Furthermore, all engine cylinders may be activated to combust air and fuel. In other words, the one deactivated cylinder may be provided with fuel (and spark, where applicable), such that all engine cylinders are combusting air and fuel. The deposits may thus be routed to the exhaust, and not to the EGR passage, due to the EGR valve being commanded closed at step 522. At 524, the predetermined duration may comprise a duration where it is expected that any carbon deposits removed from the EGR passage and/or EGR valve may be routed to exit the exhaust. In some examples, the predetermined duration at 524 may comprise 1 minute, 2 minutes, 3 minutes, 4 minutes, or 5 minutes.

Proceeding to 526, method 500 may include stopping, or deactivating the engine after an indication that the predetermined duration (of 524) has elapsed. For example, fueling and (and spark, where applicable) provided to the engine cylinders may be stopped, and the engine may spin to rest. At 528, method 500 may include updating vehicle operating parameters. Specifically, vehicle operating parameters may be updated to reflect the indication that the EGR valve and EGR passage are now clean, or free from carbon deposits. Furthermore, at 528, updating vehicle operating parameters may include setting a flag at the controller, indicating that an EGR cleaning routine was conducted, and that the routine was successful in removing carbon deposits from the EGR valve and/or EGR passage. In some examples, responsive to the completion of the EGR cleaning routine, method 500 may include sleeping the controller. Method 500 may then end.

Returning to 520, in response to an indication that the carbon deposits are not removed from the EGR valve and/or EGR passage, method 500 may proceed to 530. At 530, method 500 may include indicating whether a predetermined duration has elapsed. The predetermined duration at 530 may comprise a duration where, if carbon deposits associated with the EGR valve and/or EGR passage are the culprit behind the low EGR flow, then it may be expected that such deposits would have been removed via the EGR cleaning routine of method 500. Accordingly, if at 530 it is indicated that the predetermined duration has not yet elapsed, method 500 may return to 514, and may include continuing to operate the engine at the desired speed with the engine combusting air and fuel with one cylinder deactivated, and with DEF being injected via duty cycling the second DEF injection valve, until it is either indicated that the carbon deposits have been removed, or that the predetermined duration has elapsed. Accordingly, at 530, responsive to an indication that the predetermined duration has elapsed, method 500 may proceed to 532. At 532, method 500 may include indicating EGR system degradation. For example, because the routine of method 500 was unable to restore flow in the EGR system to the expected flow, then it may be indicated that there is some underlying reason for the low flow that cannot be remedied via the routine of method 500. Accordingly, indicating EGR system degradation at 532 may include setting a malfunction indicator light (MIL) at the vehicle dash, alerting the vehicle operator of a request to service the vehicle. Furthermore, a flag may be set at the controller, indicating that the EGR cleaning routine of method 500 was conducted, but was not successful in restoring EGR flow to the expected EGR flow.

Subsequent to the determination of EGR system degradation, method 500 may proceed to 522. Steps 522 through 528 are conducted in the same fashion regardless of whether EGR system degradation is indicated to be present, or if the carbon deposits were indicated to be removed from the EGR valve and/or EGR passage. For example, even though the EGR system was indicated to be degraded, the routine of method 500 may still result in some carbon deposits being removed from the EGR valve and/or EGR passage. Thus, at 524, the engine may be maintained activated for the predetermined duration, with the EGR valve closed and the second DEF injection valve off. At 528, updating vehicle operating parameters in light of the indicated EGR system degradation may include operating the engine in a fashion to avoid the use of EGR, until it is indicated that the degradation has been remedied. In some examples where the vehicle comprises a hybrid vehicle, the vehicle may be operated in an electric-only mode, or a hybrid mode of operation as frequently as possible, to avoid using the engine and EGR passage. Furthermore, at 528, responsive to the routine being completed, method 500 may include sleeping the controller. Method 500 may then end.

Importantly, it may be understood that the EGR cleaning methodology of FIG. 5 provides an onboard, and on-demand EGR passage/EGR valve cleaning method.

While the method of FIG. 5 depicts an EGR valve and/or EGR passage cleaning methodology that utilizes DEF injection into the intake manifold, there may be circumstances where injection into the intake manifold is not desirable, or in some examples the vehicle may not be equipped with a DEF injection line to the intake manifold. Accordingly, a different methodology may be utilized, which may comprise injection of DEF into the exhaust system. Such a method will be discussed in detail at FIG. 6.

Accordingly, turning now to FIG. 6, a high-level example method 600 for conducting an EGR cleaning routine where DEF is injected into an exhaust passage of a vehicle, is shown. More specifically, such a method may be conducted in response to a request to clean the EGR passage and/or EGR valve, and may include injection of DEF into the exhaust passage with the engine spun unfueled in reverse with the EGR valve open, to route DEF into the EGR passage. Subsequently, the engine may be activated to combust air and fuel to divert combustion heat to the EGR passage, which may vaporize the DEF, turning the water component to steam, which may result in the removal of carbon deposits associated with the EGR valve and/or EGR passage. In this way, the EGR passage may be effectively cleaned in an onboard and on-demand fashion.

Method 600 will be described with reference to the systems described herein and shown in FIGS. 1-3B, though it should be understood that similar methods may be applied to other systems without departing from the scope of this disclosure. Method 600 may be carried out by a controller, such as controller 212 in FIGS. 2A-2B, and may be stored at the controller as executable instructions in non-transitory memory. Instructions for carrying out method 600 and the rest of the methods included herein may be executed by a controller based on instructions stored on a memory of the controller and in conjunction with signals received from sensors of the engine system, such as the sensors described above with reference to FIGS. 1 and 2A-2B. The controller may employ actuators of the vehicle system such as first DEF injection valve (e.g. 292), motor (e.g. 120), fuel injector(s) (e.g. 266), air intake throttle (e.g. 262), EGR valve (e.g. 253), etc., according to the methods described below.

Method 600 begins at 602, and may include estimating and/or measuring current vehicle operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to 604, method 600 may include indicating whether conditions are met for conducting an EGR cleaning diagnostic. Conditions being met for conducting the EGR cleaning diagnostic may include an indication of low EGR flow, as monitored via a pressure sensor (e.g. 256) in the EGR passage (e.g. 250). For example, an expected amount of EGR flow in the absence of carbon deposits associated with the EGR valve and/or in the EGR passage may be stored at the controller in the form of a lookup table, comprising expected flow rates at various engine speeds and/or other operating conditions. Low EGR flow may comprise a level of EGR flow that differs from an expected EGR flow for a particular engine operating condition, by a threshold, for example differing by greater than 5%, or differing by greater than 10%. In another example, conditions being met for conducting the EGR cleaning diagnostic may include an indication of a degraded EGR system, evidenced by, for example, a rough idle or in some examples a stall condition.

Conditions being met may additionally or alternatively include a key-on event, where low flow is indicated in the EGR passage, or where the EGR system is indicated to be degraded. Conditions being met may further include an indication that a temperature of an oxidation catalyst (e.g. 226), is below a threshold temperature. In some examples, conditions being met at 504 may additionally or alternatively include an indication that a threshold duration (e.g. 1 day, 2 days, 5 days, 10 days, 15 days, greater than 20 days but less than 30 days, etc.) has elapsed since a prior EGR cleaning diagnostic. Conditions being met at 504 may additionally or alternatively include an indication that an amount of DEF stored in the DEF tank (e.g. 241) is greater than a predetermined threshold (e.g. >10%, >20%, or >30% full).

If, at 604, conditions are not indicated to be met for conducting the EGR cleaning diagnostic, method 600 may proceed to 606. At 606, method 600 may include maintaining current vehicle operating parameters. For example, if the vehicle is in operation with the engine running, such operation may be maintained. Alternatively, if the vehicle is in operation, where the vehicle is being propelled, either fully or in part, via electrical power, such operating conditions may be continued. Method 600 may then end.

Returning to 604, in response to conditions being indicated to be met for conducting the EGR cleaning diagnostic, method 600 may proceed to 607. At 607, method 600 may include commanding open the EGR valve (e.g. 253). For example, the controller may send a signal to the EGR valve, actuating it open. Proceeding to 608, method 600 may include spinning the engine unfueled in the reverse direction. Specifically, the motor (e.g. 120) may be commanded via the controller, to rotate or spin the engine unfueled in the reverse direction. In some examples, spinning the engine unfueled may include spinning the engine unfueled at a predetermined engine speed (engine RPM).

Proceeding to 610, method 600 may include duty cycling the first DEF injection valve (e.g. 292). Duty cycling the first DEF injection valve may comprise duty cycling the first DEF injection valve so as to inject a predetermined amount of DEF into the exhaust within a predetermined duration. Accordingly, proceeding to 612, method 600 may include indicating whether the predetermined duration has elapsed. If the predetermined duration has not yet elapsed, method 600 may return to 608, and may include continuing to spin the engine unfueled in the reverse direction, and may further include continuing to duty cycle the first DEF injection valve. Alternatively, responsive to the predetermined duration elapsing at 612, method 600 may proceed to 614.

It may be understood that, by injection of DEF into the exhaust passage via the first DEF injection valve and with the engine being spun unfueled in reverse with the EGR valve open, DEF may be drawn through the engine, and into the EGR passage (e.g. 250).

At 614, responsive to the predetermined duration elapsing, method 600 may include stopping spinning the engine in reverse, and activating the engine to combust air and fuel. For example, the motor may be deactivated and in an example, the engine may spin to rest, and then be activated to combust air and fuel. It may be understood that when the engine is activated to combust air and fuel, the engine spins or rotates in the default or forward direction. Furthermore, at 614, method 600 may include stopping the duty cycling of the first DEF injection valve. Fuel (and spark, where applicable) may be controlled via the controller, to control engine speed to a desired speed. Furthermore, while not explicitly shown, an exhaust tuning valve (e.g. 299) may be controlled to a position where heat from the engine is effectively routed to the EGR passage. For example, the exhaust tuning valve may be controlled to a fully closed conformation in some examples, or may be mostly closed (e.g. 20% open or less), etc., such that engine exhaust heat is routed to the EGR passage.

Accordingly, proceeding to 616, method 600 may include maintaining engine speed at the desired engine speed. For example, engine speed may be maintained at the desired speed via controlling a position of a throttle (e.g. 262). For example, responsive to a dip in engine RPM, the throttle may be commanded to a more open position, to enable additional air to be drawn into the intake, thus controlling engine speed to the desired engine speed. The desired engine speed may comprise an engine speed where heat from the combusting engine is expected to vaporize the DEF routed to the EGR passage.

Proceeding to 618, method 600 may include indicating whether carbon deposits are indicated as being removed from the EGR valve and/or EGR passage. Specifically, at 618, method 600 may include monitoring pressure in the EGR passage, and indicating whether EGR flow for the particular engine operating condition (e.g. desired engine speed) is within a threshold (e.g. within 5%) of expected EGR flow (e.g. condition of an absence of carbon deposits in the EGR passage and/or associated with the EGR valve). As discussed above, a lookup table stored at the controller may include expected EGR flow as a function of engine operating conditions, and accordingly, such a lookup table may be queried via the controller at 618 in order to indicate whether the carbon deposits have been removed from the EGR valve/EGR passage.

If, at 618, it is indicated that EGR flow is within the threshold of expected EGR flow if the carbon deposits had been removed, method 600 may proceed to 620. In other words, responsive to an indication that the carbon deposits have been removed, method 600 may proceed to 620. At 620, method 600 may include commanding the EGR valve to a closed position.

Proceeding to 622, method 600 may include maintaining the engine activated at the desired speed for a predetermined duration. Specifically, the engine may be maintained in operation combusting air and fuel in order to force any removed carbon deposits to exit the exhaust. The deposits may be routed to the exhaust, and not to the EGR passage, due to the EGR valve being commanded closed at step 620. At 622, the predetermined duration may comprise a duration where it is expected that any carbon deposits removed from the EGR passage and/or EGR valve may be routed to exit the exhaust. In some examples, the predetermined duration at 622 may comprise 1 minute, 2 minutes, 3 minutes, 4 minutes, or 5 minutes.

Proceeding to 624, method 600 may include stopping, or deactivating the engine after an indication that the predetermined duration (of 622) has elapsed. For example, fueling (and spark, where applicable) provided to the engine cylinders may be stopped, and the engine may spin to rest. At 628, method 600 may include updating vehicle operating parameters. Specifically, vehicle operating parameters may be updated to reflect the indication that the EGR valve and EGR passage are now clean, or free from carbon deposits. Furthermore, at 628, updating vehicle operating parameters may include setting a flag at the controller, indicating that an EGR cleaning routine was conducted, and that the routine was successful in removing carbon deposits from the EGR valve and/or EGR passage. In some examples, responsive to the completion of the EGR cleaning routine, method 600 may include sleeping the controller. Method 600 may then end.

Returning to 618, in response to an indication that the carbon deposits are not removed from the EGR valve and/or EGR passage, method 600 may proceed to 630. At 630, method 600 may include indicating whether a predetermined duration has elapsed. The predetermined duration at 630 may comprise a duration where, if carbon deposits associated with the EGR valve and/or EGR passage are the culprit behind the low EGR flow, then it may be expected that such deposits would have been removed via the EGR cleaning routine of method 600. Accordingly, if at 630 it is indicated that the predetermined duration has not yet elapsed, method 600 may return to 614, and may include continuing to operate the engine at the desired speed with the engine combusting air and fuel until it is either indicated that the carbon deposits have been removed, or that the predetermined duration has elapsed. Accordingly, at 630, responsive to an indication that the predetermined duration has elapsed, method 600 may proceed to 632. At 632, method 600 may include indicating EGR system degradation. For example, because the routine of method 600 was unable to restore flow in the EGR system to the expected flow, then it may be indicated that there is some underlying reason for the low flow that cannot be remedied via the routine of method 600. Accordingly, indicating EGR system degradation at 632 may include setting a malfunction indicator light (MIL) at the vehicle dash, alerting the vehicle operator of a request to service the vehicle. Furthermore, a flag may be set at the controller, indicating that the EGR cleaning routine of method 600 was conducted, but was not successful in restoring EGR flow to the expected EGR flow.

Subsequent to the determination of EGR system degradation, method 600 may proceed to 620. Steps 620 through 628 are conducted in the same fashion regardless of whether EGR system degradation is indicated to be present, or if the carbon deposits were indicated to be removed from the EGR valve and/or EGR passage. For example, even though the EGR system was indicated to be degraded, the routine of method 600 may still result in some carbon deposits being removed from the EGR valve and/or EGR passage. Thus, at 624, the engine may be maintained activated for the predetermined duration, with the EGR valve closed and the first DEF injection valve off. At 628, updating vehicle operating parameters in light of the indicated EGR system degradation may include operating the engine in a fashion to avoid the use of EGR, until it is indicated that the degradation has been remedied. In some examples where the vehicle comprises a hybrid vehicle, the vehicle may be operated in an electric-only mode, or a hybrid mode of operation as frequently as possible, to avoid using the engine and EGR passage. Furthermore, at 628, responsive to the routine being completed, method 600 may include sleeping the controller. Method 600 may then end.

Importantly, it may be understood that the EGR cleaning methodology of FIG. 6 provides an onboard, and on-demand EGR passage/EGR valve cleaning method.

Turning now to FIG. 7, an example timeline 700 for conducting a procedure to remove carbon deposits from one or more cylinders of a vehicle engine, is shown. Specifically, example timeline 700 illustrates how a vehicle system may conduct such a procedure according to the method depicted at FIG. 4. Timeline 700 includes plot 705, indicating whether conditions are indicated to be met (yes) or not (no) for conducting the cylinder cleaning operation. Timeline 700 further includes plot 710, indicating a status of the engine, over time. The engine may be either on, or off, over time. Timeline 700 further includes plot 715, indicating whether fuel is being injected to the engine cylinders, over time. Fuel injection may either be on, or off, over time. In this example timeline 700, it may be understood that fuel injection includes fuel injection to all engine cylinders. Timeline 700 further includes plot 720, indicating whether the second DEF injection valve (e.g. 296) is on, or off, over time. It may be understood that if the second DEF injection valve is on, then DEF may be injected into the intake manifold, whereas when second DEF injection valve is off, DEF may be prevented from being injected into the intake manifold. Timeline 700 further includes plot 725, indicating a speed of the engine (e.g. engine RPM), over time. Engine speed may be 0 (e.g. engine off), or may increase (+) speed compared to the engine-off state. Line 726 represents a threshold engine speed for conducting the cylinder cleaning procedure, where engine speed may be maintained above the threshold during the cylinder cleaning procedure. Timeline 700 further includes plot 730, indicating a position of an air intake throttle (e.g. 262), over time. The throttle may be fully open, fully closed, or somewhere between fully open and fully closed. Timeline 700 further includes plot 735, indicating engine cylinder torque, over time. Numerals 1, 3, 4, 2 represent each cylinder of a four-cylinder engine, and the sequence of numbers represents firing order of the individual cylinders. Furthermore, for clarity, the numerals representing cylinder firing order are not duplicated for the entire plot 735, however it may be understood that the firing order comprises 1, 3, 4, 2 for the duration of plot 735. Torque for individual cylinders may be monitored by one or more engine torque sensor(s) (e.g. 267), over time. Engine torque may increase (+) or decrease (−), over time. Line 736 represents an expected cylinder torque, provided that there is an absence of carbon deposits associated with a particular engine cylinder.

At time t0, the engine is in operation (plots 710 and 725), and is combusting air and fuel (plot 715). The second DEF injection valve (e.g. 296) is off. While not explicitly shown, it may be further understood that, if included, first DEF injection valve (e.g. 292) is also off. A power balance test, for example, indicates that one cylinder (cylinder 4 in this example), is underperforming (plot 735), where underperforming may be understood to mean not producing an expected amount of cylinder torque. The expected amount of cylinder torque may comprise a level of torque expected if the cylinder were free from any carbon deposits, for example. However, at time t0, conditions are not yet indicated to be met for conducting the cylinder cleaning operation.

At time t1, it is indicated that conditions are met for conducting the cylinder cleaning operation (plot 705). For example, conditions being indicated to be met at time t1 may include an engine idle condition. Further circumstances for indicating whether conditions are met at time t1 for conducting the cleaning operation have been discussed in detail at step 404 of method 400, and thus for brevity, will not be reiterated here. However, in this example timeline 700 it may be understood that the vehicle operator has entered into a key-off condition where the engine is kept running to conduct the cylinder cleaning operation. For example, a message may be communicated to the vehicle operator, that the cylinder diagnostic is being conducted. Such a message may be communicated to the vehicle operator via a human-machine interface (HMI), for example. It may be understood that the controller may be maintained awake, to conduct the procedure.

With conditions being indicated to be met for conducting the cylinder cleaning operation according to method 400 depicted at FIG. 4, DEF is injected into the intake manifold via second DEF injection valve (e.g. 296). Specifically, second DEF injection valve may be duty cycled such that a predetermined amount of DEF is injected into the intake manifold within predetermined duration(s). While DEF is being injected into the intake manifold between time t1 and t2, engine RPM is maintained above the threshold engine speed, represented by line 726. However, at time t2, engine speed dips below the threshold engine speed. Accordingly, between time t2 and t3, the throttle (e.g. 262) is controlled to a more open position, resulting in engine speed increasing to the threshold speed at time t4.

Between time t3 and t4, engine speed is maintained above the threshold engine speed, and DEF is continued to be injected into the intake manifold. Furthermore, between time t3 and t4, cylinder torque for the underperforming engine cylinder (cylinder 4 in this example), returns to producing the expected amount of torque, represented by line 736.

With the underperforming engine cylinder being restored to producing the expected torque, at time t4 it is indicated that the cylinder cleaning procedure successfully removed carbon deposits from the underperforming cylinder. Accordingly, the second DEF injection valve is turned off (plot 720). However, the engine is maintained activated between time t4 and t5, to vaporize any remaining amounts of DEF injected into the intake manifold and or within engine cylinders.

At time t5, the engine is deactivated (plot 710), and fuel injection to the engine cylinders is discontinued (plot 715). Accordingly, conditions are no longer indicated to be met for conducting the cylinder cleaning diagnostic procedure (plot 705). Between time t5 and t6, the engine spins to rest. While not explicitly illustrated, responsive to completion of the cylinder cleaning diagnostic, the controller may be put to sleep.

While this example timeline illustrated a situation where conditions being met for conducting the cylinder cleaning diagnostic included a key-off condition where the controller was kept awake with the engine in operation to conduct the procedure, the procedure may be conducted under other operating conditions. For example, such a procedure may be conducted at an engine idle condition where the vehicle is stopped for a duration long enough to conduct the procedure. For example, if the vehicle is in an idle stop at a traffic light, the procedure may be conducted in some examples.

Turning now to FIG. 8, an example timeline 800 for conducting an EGR system cleaning operation or EGR system cleaning procedure, is shown. More specifically, example timeline 800 illustrates how a vehicle system may conduct such a procedure according to the method depicted at FIG. 5. Timeline 800 includes plot 805, indicating whether conditions are indicated to be met (yes), or not (no), for conducting the EGR system cleaning procedure, over time. Timeline 800 further includes plot 810, indicating an engine status, over time. The engine may be on, and spinning or rotating in a forward or default direction, or the engine may be off. Timeline 800 further includes plot 815, indicating whether fuel injection is being provided to engine cylinders, over time. Illustrated for plot 815 are numerals 1, 3, 4, 2, which represent individual engine cylinders, and where the sequence of numbers represents firing order of the individual cylinders. While only two sequences or numbers are indicated for clarity, it may be understood that the firing sequence repeats in line with the indicated firing order sequence. Timeline 800 further includes plot 820, indicating whether second DEF injection valve (e.g. 296) is on, or off, over time. It may be understood that when second DEF injection valve is on, DEF is being injected into the intake manifold. Timeline 800 further includes plot 825, indicating engine speed (e.g. engine RPM), over time. Line 826 represents a threshold engine speed, where if engine speed drops below the threshold engine speed, engine speed may be increased to above the threshold speed. Engine speed may either be 0 RPM (e.g. engine stopped), or engine speed may increase (+) as compared to being stopped. Timeline 800 further includes plot 830, indicating a position of an air intake throttle (e.g. 262), over time. The throttle may be fully open (open), fully closed (closed), or somewhere between fully open or fully closed. Timeline 800 further includes plot 835, indicating whether an EGR valve (e.g. 253) is open, or closed, over time. Timeline 800 further includes plot 840, indicating an EGR flow, over time. EGR flow may be measured, for example, via one or more pressure sensor(s) (e.g. 256). Line 841 represents an expected EGR flow, where the expected EGR flow comprises an EGR flow that is expected if carbon deposits are absent from the EGR passage and/or EGR valve. EGR flow may comprise no flow (0), expected flow, or may be between the expected flow and no flow.

At time t0, the engine is in operation (plot 810), and is combusting air and fuel (plot 815). The second DEF injection valve is off (plot 820), and the EGR valve is closed (plot 835). Accordingly with the EGR valve closed, there is no flow in the EGR system (plot 840). Conditions are not yet met for conducting the EGR cleaning procedure (plot 805). However, while not explicitly illustrated, it may be understood that the controller has recognized a low flow condition in the EGR system, and has scheduled an EGR cleaning procedure to be conducted responsive to conditions being met.

Accordingly, at time t1, conditions are indicated to be met for conducting the EGR cleaning procedure. For example, in this example timeline 800 it may be understood that a key-off event has occurred. Thus, with conditions being met for conducting the EGR cleaning procedure, the controller is maintained awake at time t1, and while fuel injection to the engine cylinders is stopped (plot 815), the engine is maintained spinning unfueled, for example, via the motor. Furthermore, at time t1, with conditions being met for conducting the diagnostic, the EGR valve (e.g. 253) may be commanded to an open position. For example, the EGR valve may be commanded to a fully open position.

Responsive to conditions being met for conducting the EGR cleaning procedure, the second DEF injection valve is duty cycled (plot 820) between time t1 and t2, to inject a predetermined amount of DEF into the intake manifold, within a predetermined duration. Subsequent to the predetermined duration elapsing at time t2, fuel injection (and spark, where applicable) is provided to a plurality of engine cylinders, but where one engine cylinder is not provided with fuel injection (or spark, where applicable). In other words, all engine cylinders but one may be activated to combust air and fuel (plot 815), with the one engine cylinder not combusting air and fuel. In this example timeline 800, cylinder 3 is illustrated as being deactivated, or not receiving fuel injection (or spark, where applicable).

With all but one of the engine cylinders combusting air and fuel, DEF may be continued to be injected into the intake manifold (plot 820) between time t2 and t3. With DEF being continued to be injected into the intake manifold, and with one cylinder deactivated, the deactivated cylinder may comprise a route for which DEF may be routed to the EGR passage, similar to that discussed above when all cylinders were deactivated but where the engine was being spun unfueled.

With the engine combusting air and fuel (except for the one cylinder), combustion heat from the engine may result in the vaporization of the DEF, which may turn the water component of the DEF into steam, thereby cleaning carbon deposits associated with the EGR valve and/or EGR passage. Accordingly, flow in the EGR passage is monitored between time t2 and t3, as to whether the EGR flow is still lower than expected, or if the EGR flow becomes substantially equivalent (e.g. within 5%) of the expected EGR flow.

At time t3, EGR flow is indicated to comprise the expected flow. Accordingly DEF injection into the intake manifold is stopped (plot 820). Fuel injection to the engine cylinders is maintained (plot 815), with the exception being that all cylinders are fueled. In other words all engine cylinders are combusting air and fuel. At time t4, the EGR valve is closed, thus between time t4 and t5 EGR flow is reduced to no flow. The engine is maintained in operation to combust air and fuel between time t4 and t5, which may push any carbon deposits that have been removed from the EGR passage to exit the exhaust. At time t5, conditions are no longer indicated to be met for conducting the EGR system cleaning diagnostic (plot 805). Accordingly, at time t5, the engine is turned off (plot 810), and fuel injection to engine cylinders is stopped (plot 815). Thus, after time t5, the engine spins to rest (plot 825). While not explicitly shown, subsequent to completion of the test diagnostic, the controller may be put to sleep.

Turning now to FIG. 9, another example timeline 900 for conducting an EGR system cleaning operation, or EGR system cleaning procedure, is shown. More specifically, example timeline 900 illustrates how a vehicle system may conduct such a procedure according to the method depicted at FIG. 6. Timeline 900 includes plot 905, indicating whether conditions are met (yes) or not (no) for conducting the EGR cleaning procedure according to method 600 depicted at FIG. 6. Timeline 900 further includes plot 910, indicating engine status, over time. The engine may be off, or may be being rotated in a forward (fwd) or reverse (rev) direction. Timeline 900 further includes plot 915, indicating whether fuel injection to engine cylinders is on, or off, over time. Timeline 900 further includes plot 920, indicating whether a first DEF injection valve (e.g. 292) is on, or off, over time. It may be understood that when first DEF injection valve is "on", DEF is being injected into the exhaust passage. Timeline 900 further includes plot 925, indicating engine speed (e.g. engine RPM), over time. Line 926 represents a threshold engine speed, which, if engine speed drops below the threshold speed during a particular portion of the test (e.g. while the engine is activated to combust air and fuel), the engine may be controlled back to a desired engine speed. Timeline 900 further includes plot 930, indicating a position of an air intake throttle (e.g. 262), over time. The throttle may be either fully closed (closed), fully open (open), or somewhere between. Timeline 900 further includes plot 935, indicating a status of an EGR valve (e.g. 253), over time. The EGR valve may be either open, or closed, over time. Timeline 900 further includes plot 940, indicating an EGR flow in the EGR system, over time. EGR flow may either be at an expected EGR flow for particular vehicle operating conditions, may be at no flow (0), or may be somewhere between. Line 941 represents the expected EGR flow for particular operating conditions.

At time t0, the engine is off (plot 910). While not explicitly shown, it may be understood that the engine has been off for a duration such that an oxidation catalyst (e.g. 226) temperature is below a threshold temperature. The threshold temperature may comprise a temperature where DEF may be routed across the catalyst without the DEF being vaporized. At time t0, conditions are not yet indicated to be met for conducting the EGR cleaning diagnostic (plot 905). With the engine off, fuel injection to the cylinders of the engine is also off (plot 915). Furthermore, as conditions are not indicated to be met for conducting the EGR cleaning procedure, the first DEF injection valve is off (plot 920). With the engine off, engine RPM is at 0 (plot 925), and a position of the throttle comprises a key-off throttle position (plot 930). Still further, the EGR valve is closed (plot 935), and there is no EGR flow at time t0 (plot 940).

At time t1, conditions are indicated to be met for conducting the EGR cleaning procedure (plot 905). For example, it may be understood that at time t1, a key-on event has occurred, where the EGR cleaning procedure was scheduled for the next available opportunity where conditions are met for conducting the procedure. In other words, it may be understood that the oxidation catalyst is below the threshold temperature at time t1.

With conditions being indicated to be met for conducting the EGR cleaning procedure at time t1, the EGR valve (e.g. 253) is commanded open at time t1. With the EGR valve commanded open, the engine is spun in a reverse orientation, by for example, the motor (e.g. 120), between time t1 and t2. Furthermore, the first DEF injection valve is duty cycled between time t1 and t2, to inject DEF into the exhaust passage. The duty cycle may comprise a duty cycle whereby a predetermined amount of DEF is injected into the exhaust passage, within a predetermined duration. Engine speed is controlled to a predetermined or desired engine speed (plot 925) between time t1 and t2. By spinning the engine unfueled in reverse, where DEF is injected into the exhaust passage, it may be understood that DEF may be routed, via the engine, to the EGR passage, due to the open EGR valve. Such routing of DEF to the EGR passage may be conducted for the predetermined duration.

At time t2, the predetermined duration elapses. Accordingly, first DEF injection valve is turned off, and the engine is stopped from being rotated in reverse. In other words, the motor may be deactivated, and the engine may spin to rest between time t2 and t3 (plot 925). Subsequent to the engine spinning to rest, the engine may be activated at time t3 in a mode where the engine combusts air and fuel. Specifically, the engine may be activated to be rotated in a forward direction (plot 910), where fueling (plot 915) (and spark, where applicable) is provided to each of the engine cylinders (1, 3, 4, 2). By operating the engine to combust air and fuel, it may be understood that the heat from combustion may be directed to the EGR passage (as the EGR valve is maintained open), to vaporize the DEF that was routed to the EGR passage. Accordingly, between time t3 and t4, the engine is controlled to a speed above a threshold speed (represented by line 926). The threshold speed may comprise a speed for which an engine stall while conducting the procedure is likely to be avoided, or prevented. Furthermore, between time t3 and t4, EGR flow is monitored, for example, via a pressure sensor (e.g. 256).

By time t4, flow in the EGR system reaches the expected EGR flow, where expected EGR flow comprises an expected flow for the given operating conditions, under conditions of an absence of carbon deposits associated with the EGR valve and/or EGR passage.

As the EGR flow is returned to the expected flow at time t4, the EGR valve is closed (plot 935), and thus between time t4 and t5, EGR flow in the EGR passage drops to no flow. However, the engine is maintained activated to combust air and fuel between time t4 and t5. The engine is maintained activated such that any of the carbon deposits that have been removed from the EGR passage and/or EGR valve may be forced to exit the exhaust passage, as the EGR valve is closed. The engine may be maintained activated for a predetermined duration of time subsequent to the indication that the EGR passage and/or EGR valve have been cleaned. Thus, at time t5, the predetermined duration of time expires, and accordingly, conditions are no longer indicated to be met for conducting the EGR cleaning procedure (plot 905). Furthermore, in this example timeline, it may be understood that the key-on event at time t1 was initiated with the intent to drive the vehicle to another destination. Thus, while fuel injection is stopped at time t5, it may be understood that the engine is maintained being spun in the forward direction via the motor, to enable a vehicle launch in an electric mode of operation. Accordingly, between time t5 and t6, the engine is maintained spinning in the forward direction, unfueled.

In this way, vehicle engine cylinders may be cleaned in an onboard and on-demand fashion. By regularly cleaning the engine cylinders, carbon deposits may be regularly removed from engine cylinders. Such actions may lead to engine performance improvements, and increased fuel economy. Still further, undesired emissions may be reduced.

The technical effect is to recognize that for vehicles that include a DEF injection system, such a system may be utilized to route DEF into the intake manifold of the engine, such that while the engine is combusting, the DEF may be drawn into the engine. By drawing the DEF into the combusting engine, the water component of the DEF may be vaporized, whereby the steam may serve to effectively clean the engine and associated componentry of carbon deposits. A further technical effect is to recognize that in order to route the DEF to the intake manifold, a DEF line may be introduced to specifically route the DEF to the intake manifold under predetermined operating conditions. In this way, a DEF injection system, which is present in diesel vehicles, may be used to conduct engine cylinder cleaning operations. By utilizing the DEF injection system, which is already present in diesel vehicles, costs associated with cylinder cleaning operations may be significantly reduced. Furthermore, such procedures may result in less time spent servicing the vehicle, which may decrease costs associated with vehicle repairs, which may lead to increased customer satisfaction.

The systems described herein, and with reference to FIGS. 1-3B, along with the methods described herein, and with reference to FIGS. 4-6, may enable one or more systems and one or more methods. In one example, a method comprises in response to an indication of degradation in one or more cylinders of an engine of a vehicle, reducing a carbon buildup associated with the one or more cylinders by injecting a diesel exhaust fluid into an intake manifold of the engine, and drawing the diesel exhaust fluid into the engine while the engine is combusting air and fuel. In a first example of the method, the method further includes wherein the diesel exhaust fluid is stored in a tank positioned in a diesel exhaust fluid system, and wherein a first diesel exhaust fluid line is configured to selectively route the diesel exhaust fluid to an exhaust passage, and where a second diesel exhaust fluid line is configured to selectively route the diesel exhaust fluid to the intake manifold. A second example of the method optionally includes the first example, and further comprises adjusting an air/fuel ratio while the diesel exhaust fluid is being injected into the intake manifold while the engine is combusting air and fuel. A third example of the method optionally includes any one or more or each of the first and second examples, and further includes wherein adjusting the air/fuel ratio includes controlling the air/fuel ratio to a rich air/fuel ratio. A fourth example of the method optionally includes any one or more or each of the first through third examples, and further includes wherein the diesel exhaust fluid comprises a water component and a urea component. A fifth example of the method optionally includes any one or more or each of the first through fourth examples, and further includes wherein injecting the diesel exhaust fluid into the intake manifold and drawing the diesel exhaust fluid into the engine while the engine is combusting air and fuel results in the water component of the diesel exhaust fluid vaporizing to steam in order to reduce the carbon buildup. A sixth example of the method optionally includes any one or more or each of the first through fifth examples, and further includes wherein the indication of degradation further comprises an indication of a torque measured in the one or more cylinders of the engine being below an expected or desired torque, and/or an indication of a pressure in the one or more cylinders of the engine being below an expected or desired pressure. A seventh example of the method optionally includes any one or more or each of the first through sixth examples, and further comprises injecting the diesel exhaust fluid into the intake manifold during an engine idle condition. An eighth example of the method optionally includes any one or more or each of the first through seventh examples, and further comprises injecting the diesel exhaust fluid into the intake manifold in response to a key-off event where a controller of the vehicle is maintained in an awake state to reduce the carbon buildup, and where the controller is put to sleep subsequent to reducing the carbon buildup. A ninth example of the method optionally includes any one or more or each of the first through eighth examples, and further includes wherein an amount of the diesel exhaust fluid injected into the intake manifold is a threshold amount less than an amount of fuel provided to the engine, during a time period comprising the injecting of the diesel exhaust fluid. A tenth example of the method optionally includes any one or more or each of the first through ninth examples, and further comprises controlling engine speed to a desired engine speed during the injecting of the diesel exhaust fluid into the intake manifold.

Another example of a method comprises in a first operating condition of a vehicle, including an indication of degradation of one or more cylinders of an engine and a lack of degradation indicated in an exhaust gas recirculation system, injecting a diesel exhaust fluid into an intake manifold of an engine with an exhaust gas recirculation valve closed to mitigate the degradation of the one or more cylinders; and in a second operating condition of the vehicle, including an indication of degradation in the exhaust gas recirculation system, and either a lack of degradation in the one or more cylinders and/or the indication of degradation in the one or more cylinders of the engine, injecting the diesel exhaust fluid into the intake manifold of the engine with the exhaust gas recirculation valve open to mitigate the degradation of the exhaust gas recirculation system. In a first example of the method, the method further includes wherein the indication of degradation of one or more cylinders includes an indication of a torque measured in the one or more cylinders of the engine being below an expected or desired torque, and/or an indication of a pressure in the one or more cylinders of the engine being below an expected or desired pressure. A second example of the method optionally includes the first example, and further comprises injecting the diesel exhaust fluid into the intake manifold while the engine is combusting air and fuel during the first operating condition; and stopping the injecting of the diesel exhaust fluid into the intake manifold in response to an indication that the degradation of the one or more engine cylinders has been mitigated, where mitigating the degradation of the one or more engine cylinders includes reducing or removing carbon buildup associated with the one or more engine cylinders. A third example of the method optionally includes any one or more or each of the first and second examples, and further comprises injecting the diesel exhaust fluid into the intake manifold while the engine is rotated unfueled in a forward direction in the second condition, where injecting the diesel exhaust fluid and rotating the engine unfueled is conducted for a first predetermined duration; and in response to the first predetermined duration elapsing, activating the engine to combust air and fuel with one engine cylinder not receiving fuel; maintaining the injecting the diesel exhaust fluid into the intake manifold, and maintaining the exhaust gas recirculation valve open while the engine is combusting air and fuel, and stopping injecting the diesel exhaust fluid and closing the exhaust gas recirculation valve in response to an indication that the degradation in the exhaust gas recirculation system has been mitigated, where mitigating the degradation in the exhaust gas recirculation system includes reducing or removing carbon buildup in an exhaust gas recirculation passage of the exhaust gas recirculation system and/or reducing or removing carbon buildup associated with the exhaust gas recirculation valve. A fourth example of the method optionally includes any one or more or each of the first through third examples, and further includes wherein the one engine cylinder not receiving fuel does not comprise the one or more cylinders of the engine with the indicated degradation in the second condition. A fifth example of the method optionally includes any one or more or each of the first through fourth examples, and further includes wherein the indication of degradation in the exhaust gas recirculation system is in response to a flow in the exhaust gas recirculation system being below a desired flow under predetermined vehicle operating conditions when the exhaust gas recirculation valve is open, and/or in response to the flow in the exhaust gas recirculation system being above the desired flow under conditions when the exhaust gas recirculation valve is closed.

A system for a vehicle comprises an engine system including an engine with a plurality of engine cylinders, an intake manifold of the engine and an exhaust passage of the engine; a diesel exhaust fluid (DEF) injection system, including a first DEF delivery line selectively fluidically coupled to the exhaust passage via a first DEF injection valve, and including a second DEF delivery line selectively fluidically coupled to the intake manifold via a second DEF injection valve; one or more torque sensors configured to provide an indication of a torque of the plurality of engine cylinders; and a controller storing instructions in non-transitory memory that, when executed, cause the controller to: monitor the torque of the plurality of engine cylinders; indicate a carbon buildup present on one or more of the plurality of engine cylinders as a function of the torque as monitored via the one or more torque sensors; and in response to the carbon buildup indicated to be present on the one or more of the plurality of engine cylinders, duty cycle the second DEF injection valve while maintaining the first DEF injection valve closed, and operate the engine to combust air and fuel during the duty cycling of the second DEF injection valve in order to remove the carbon buildup. In a first example of the system, the system further comprises an exhaust gas recirculation system including an exhaust gas recirculation passage, an exhaust gas recirculation valve, and a pressure sensor positioned in the exhaust gas recirculation passage; and wherein the controller includes further instructions to indicate whether there is degradation in the exhaust gas recirculation system as a function of a flow in the exhaust gas recirculation system as monitored via the pressure sensor positioned in the exhaust gas recirculation passage under predetermined conditions; and under conditions where degradation of the exhaust gas recirculation system is not indicated to be present but where the carbon buildup is indicated to be present on the one or more of the plurality of engine cylinders, duty cycle the second DEF injection valve and operate the engine to combust air and fuel during the duty cycling of the second DEF injection valve with the exhaust gas recirculation valve closed. A second example of the system optionally includes the first example and further comprises a motor configured to rotate the engine unfueled, and wherein the controller stores additional instructions to, in response to the indication of degradation in the exhaust gas recirculation system and further responsive to the indication of the carbon buildup on the one or more of the plurality of engine cylinders, prior to duty cycling the second DEF injection valve and operating the engine to combust air and fuel; duty cycle the second DEF injection valve with the exhaust gas recirculation valve open, while operating the motor to rotate the engine unfueled for a first predetermined duration; and subsequent to the first predetermined duration elapsing, activating the engine to combust air and fuel with one cylinder of the engine unfueled while continuing to duty cycle the second DEF injection valve, where the one cylinder of the engine that is unfueled comprises a cylinder not indicated to have carbon buildup present, for a second predetermined duration or until it is indicated that one or more of the carbon buildup present on the one or more engine cylinders and/or the degradation in the exhaust gas recirculation system is mitigated. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
in a first operating condition of a vehicle, including an indication of degradation of one or more cylinders of an engine and a lack of degradation indicated in an exhaust gas recirculation system, injecting a diesel exhaust fluid into an intake manifold of the engine with an exhaust gas recirculation valve closed to mitigate the degradation of the one or more cylinders; and
in a second operating condition of the vehicle, including an indication of degradation in the exhaust gas recirculation system, and either a lack of degradation in the one or more cylinders and/or the indication of degradation in the one or more cylinders of the engine, injecting the diesel exhaust fluid into the intake manifold of the engine with the exhaust gas recirculation valve open to mitigate the degradation of the exhaust gas recirculation system.

2. The method of claim 1, wherein the indication of degradation of one or more cylinders includes an indication of a torque measured in the one or more cylinders of the engine being below an expected or desired torque, and/or an indication of a pressure in the one or more cylinders of the engine being below an expected or desired pressure.

3. The method of claim 1, further comprising injecting the diesel exhaust fluid into the intake manifold while the engine is combusting air and fuel during the first operating condition; and
stopping the injecting of the diesel exhaust fluid into the intake manifold in response to an indication that the degradation of the one or more engine cylinders has been mitigated, where mitigating the degradation of the one or more engine cylinders includes reducing or removing carbon buildup associated with the one or more engine cylinders.

4. The method of claim 1, further comprising injecting the diesel exhaust fluid into the intake manifold while the engine is rotated unfueled in a forward direction in the second condition, where injecting the diesel exhaust fluid and rotating the engine unfueled is conducted for a first predetermined duration; and in response to the first predetermined duration elapsing, activating the engine to combust air and fuel with one engine cylinder not receiving fuel;

maintaining the injecting the diesel exhaust fluid into the intake manifold, and maintaining the exhaust gas recirculation valve open while the engine is combusting air and fuel, and stopping injecting the diesel exhaust fluid and closing the exhaust gas recirculation valve in response to an indication that the degradation in the exhaust gas recirculation system has been mitigated, where mitigating the degradation in the exhaust gas recirculation system includes reducing or removing carbon buildup in an exhaust gas recirculation passage of the exhaust gas recirculation system and/or reducing or removing carbon buildup associated with the exhaust gas recirculation valve.

5. The method of claim 4, wherein the one engine cylinder not receiving fuel does not comprise the one or more cylinders of the engine with the indicated degradation in the second condition.

6. The method of claim 1, wherein the indication of degradation in the exhaust gas recirculation system is in response to a flow in the exhaust gas recirculation system being below a desired flow under predetermined vehicle operating conditions when the exhaust gas recirculation valve is open, and/or in response to the flow in the exhaust gas recirculation system being above the desired flow under conditions when the exhaust gas recirculation valve is closed.

* * * * *